United States Patent
Nakabayashi et al.

(10) Patent No.: US 12,415,585 B2
(45) Date of Patent: Sep. 16, 2025

(54) VEHICLE INFORMATION NOTIFICATION DEVICE

(71) Applicant: HONDA MOTOR CO., LTD., Tokyo (JP)

(72) Inventors: Shunichi Nakabayashi, Tokyo (JP); Masato Nakata, Tokyo (JP); Akihiko Tomoda, Tokyo (JP); Ko Hosokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 18/034,712

(22) PCT Filed: Oct. 18, 2021

(86) PCT No.: PCT/JP2021/038429
§ 371 (c)(1),
(2) Date: May 1, 2023

(87) PCT Pub. No.: WO2022/107527
PCT Pub. Date: May 27, 2022

(65) Prior Publication Data
US 2023/0399071 A1    Dec. 14, 2023

(30) Foreign Application Priority Data

Nov. 19, 2020  (JP) ................... 2020-192716

(51) Int. Cl.
*B62J 50/23* (2020.01)
*B62J 50/22* (2020.01)
*B62K 21/00* (2006.01)

(52) U.S. Cl.
CPC ............... *B62J 50/23* (2020.02); *B62J 50/22* (2020.02); *B62K 21/00* (2013.01)

(58) Field of Classification Search
CPC ..... B62J 6/24; B62J 25/02; B62J 27/00; B62J 45/41; B62J 50/22; B62J 50/23;
(Continued)

(56) References Cited

U.S. PATENT DOCUMENTS 10,029,683 B1 *   7/2018   Ginther ................. B60W 50/16
2010/0259417 A1 * 10/2010   Nieves ..................... B60Q 9/00
                                                             340/901

(Continued)

FOREIGN PATENT DOCUMENTS

CN        105460124        4/2016
CN        110582436       12/2019
(Continued)

OTHER PUBLICATIONS

International Search Report and Written Opinion for International Application No. PCT/JP2021/038429 mailed on Dec. 28, 2021, 12 pages.

(Continued)

*Primary Examiner* — Hai H Huynh
*Assistant Examiner* — Johnny H Hoang
(74) *Attorney, Agent, or Firm* — Amin, Turocy & Watson, LLP

(57) ABSTRACT

This vehicle information notification device includes: movable portions which are provided in at least one of a pair of left and right vehicle body outer portions in a vehicle body, steerably supporting a steering system component, to be operated by actuators, wherein the movable portions include outer surfaces which are able to contact a driver's body, and wherein the movable portions notify the driver of predetermined information by operating the outer surfaces in a predetermined motion.

10 Claims, 15 Drawing Sheets

(58) Field of Classification Search
CPC .............. B60W 10/18; B60W 10/20; B60W 30/18163; B60W 50/14; B60W 50/16; B60W 2300/36; B60W 2050/146; B60Q 9/008; B60T 8/1706; B62D 1/14; B62K 21/26

See application file for complete search history.

(56) References Cited

U.S. PATENT DOCUMENTS

| | | | |
|---|---|---|---|
| 2016/0090037 A1 | 3/2016 | Tetsuka et al. | |
| 2016/0155305 A1* | 6/2016 | Barsilai | G08B 6/00 |
| | | | 340/407.1 |
| 2018/0033306 A1* | 2/2018 | Kim | G06V 40/103 |
| 2018/0043905 A1* | 2/2018 | Kim | B60W 10/20 |
| 2018/0056996 A1* | 3/2018 | Lee | B60W 30/09 |
| 2019/0139509 A1* | 5/2019 | Shin | G08G 1/096775 |
| 2019/0315375 A1 | 10/2019 | Li et al. | |
| 2021/0056784 A1* | 2/2021 | Nozawa | B60W 50/14 |
| 2022/0176956 A1* | 6/2022 | Kakeda | B60W 50/10 |
| 2023/0391402 A1* | 12/2023 | Iwamaru | B60W 40/076 |

FOREIGN PATENT DOCUMENTS

| | | |
|---|---|---|
| CN | 111660808 | 9/2020 |
| JP | 2005-280487 | 10/2005 |
| JP | 2007-112316 | 5/2007 |
| JP | 2013-244767 | 12/2013 |
| JP | 2014-203196 | 10/2014 |
| JP | 2016-068606 | 5/2016 |
| JP | 2018-181269 | 11/2018 |
| JP | 2020-158067 | 10/2020 |
| WO | 2013/131671 | 9/2013 |
| WO | 2020/194686 | 10/2020 |

OTHER PUBLICATIONS

Chinese Office Action for Chinese Patent Application No. 202180075888.3 dated Jun. 13, 2025.

* cited by examiner

VEHICLE INFORMATION NOTIFICATION DEVICE

TECHNICAL FIELD

The present invention relates to a vehicle information notification device.

The present application claims priority based on Japanese Patent Application No. 2020-192716 filed on Nov. 19, 2020, the contents of which are incorporated herein by reference.

BACKGROUND ART

Conventionally, it is known that a tactile stimulus device provided on a rim of a steering wheel or the like gives information to a driver through the tactile sense during automatic driving of a vehicle (for example, see Patent Document 1).

RELATED ART DOCUMENT

Patent Document

Patent Document 1: Japanese Unexamined Patent Application, First Publication No. 2018-181269

SUMMARY

Problems to be Solved by the Invention

Since the above-described tactile information notification is performed on the part that the driver constantly touches while driving the vehicle compared to the visual information notification, it is possible to reliably notify the driver of information.

However, when the driver needs to perform the steering operation while receiving notified information, it is conceivable that the driver will feel complicated when receiving the notified information. Accordingly, there is a desire to improve the complicated feeling.

Here, an object of the present invention is to easily receive information notified in a vehicle information notification device that notifies a driver of information by tactile sense.

Means for Solving the Problem

As a solution to the above problems, a vehicle information notification device of the present invention includes: movable portions which are provided in at least one of a pair of left and right vehicle body outer portions in a vehicle body, steerably supporting a steering system component, to be operated by actuators. The movable portions include outer surfaces which are able to contact a driver's body, and the movable portions notify the driver of predetermined information by operating the outer surfaces in a predetermined motion.

According to this configuration, the movable portion is provided in at least one of the pair of left and right vehicle body outer portions of the vehicle body. By the operation of the movable portion, predetermined information can be notified to the driver's body in advance. The movable portion needs to be separated from the steering system component (especially, handle). Accordingly, the notification of information by the movable portion and the steering operation are separated from each other and the driver can easily receive notified information.

In the present invention, the movable portions may include the outer surfaces provided in front of a seat and above a step to be able to contact driver's legs.

According to this configuration, an outer surface that can contact the driver's legs is placed in front of the seat and above the step (where the driver performs a knee gripping operation) to be operated. Accordingly, predetermined information can be notified to the driver's legs.

In the present invention, the movable portions may be operated so that the outer surfaces are moved outward in a vehicle width direction.

According to this configuration, the movable portion is operated so that the outer surface is moved outward in the vehicle width direction. Accordingly, it is possible to increase the certainty of contact with the driver's legs and to easily receive notified information by the driver.

In the present invention, the movable portions may be respectively provided in the pair of left and right vehicle body outer portions and are operable independently of each other.

According to this configuration, since the pair of left and right movable portions is operated independently of each other, it is possible to combine the difference in which of the left and right movable portions is operated. Accordingly, it is possible to notify the driver of a lot of information and to increase the type of information to be notified.

In the present invention, the vehicle information notification device may include an operation intervention function capable of intervening in operations performed by the driver and the movable portions may be operated while being interlocked with the operation intervention function.

According to this configuration, the movable portion is operated while being interlocked with the operation intervention function for the operation of the driver. Accordingly, it is possible to notify the driver that the operation intervention function is operated by the operation of the movable portion.

In the present invention, when the operation intervention function is operated, the movable portions may start to be operated at a timing earlier than a timing of starting the operation of the operation intervention function.

According to this configuration, the movable portion starts to be operated at a timing earlier than the start of the operation of the operation intervention function. Accordingly, it is possible to notify the driver of the start of the operation of the operation intervention function in advance.

In the present invention, at least one of a steering intervention function and a braking intervention function may be provided as the operation intervention function.

According to this configuration, at least one of the steering intervention function and the braking intervention function of the operation intervention function is operated. Accordingly, it is possible to notify the driver by the operation of the movable portion.

In the present invention, both the left and right movable portions may be operated when the braking intervention function is operated.

According to this configuration, the operation of the braking intervention function is notified to the driver by the operation of both left and right movable portions. Accordingly, it is possible to increase the certainty of the notification of the operation of the braking intervention function that tends to cause behavior.

In the present invention, one of the left and right movable portions may be operated when the steering intervention function is operated.

According to this configuration, the operation of the steering intervention function is notified to the driver by the operation of one of the left and right movable portions. Accordingly, it is possible to notify the driver of information including a steering direction by the steering intervention function depending on which of the left and right movable portions is operated.

In the present invention, the steering intervention function may include a course change function for changing a course of a vehicle to any one of left and right. The movable portions may be operated so that the outer surfaces are moved outward in the vehicle width direction. When the steering intervention function is operated, the movable portions that change the course of the vehicle may be operated so that the outer surfaces are moved outward in the vehicle width direction.

According to this configuration, the movable portion that changes the course of the vehicle is operated so that the outer surface is moved outward in the vehicle width direction when the course change function of the steering intervention function is operated. Accordingly, the leg of the driver on the side of the course change is opened outward in the vehicle width direction, and the posture suitable for steering can be urged.

In the present invention, in a standby state in which a system of the operation intervention function is activated and the operation intervention function is not operated yet, the movable portions may be operated as below. That is, the movable portions may be operated in an operation mode different from that when the operation intervention function is operated.

According to this configuration, there is a standby state of the operation intervention function before the operation intervention function is operated and in the standby state, the movable portion is operated in an operation mode different from that when the operation intervention function is operated. Accordingly, it is possible to notify the driver that the operation intervention function is in the standby state.

In the present invention, the vehicle information notification device may further include: display devices which display predetermined information for the driver while being interlocked with the operation of the movable portions.

According to this configuration, the vehicle information notification device further includes the display device which is operated while being interlocked with the operation of the movable portion. Accordingly, it is possible to further reliably notify the driver of information by the operation of the movable portion and the display of the display device.

Advantage of the Invention

According to the present invention, in the vehicle information notification device that notifies the driver of information by tactile sense, information can be easily notified.

DESCRIPTION OF THE EMBODIMENTS

Figure 1:
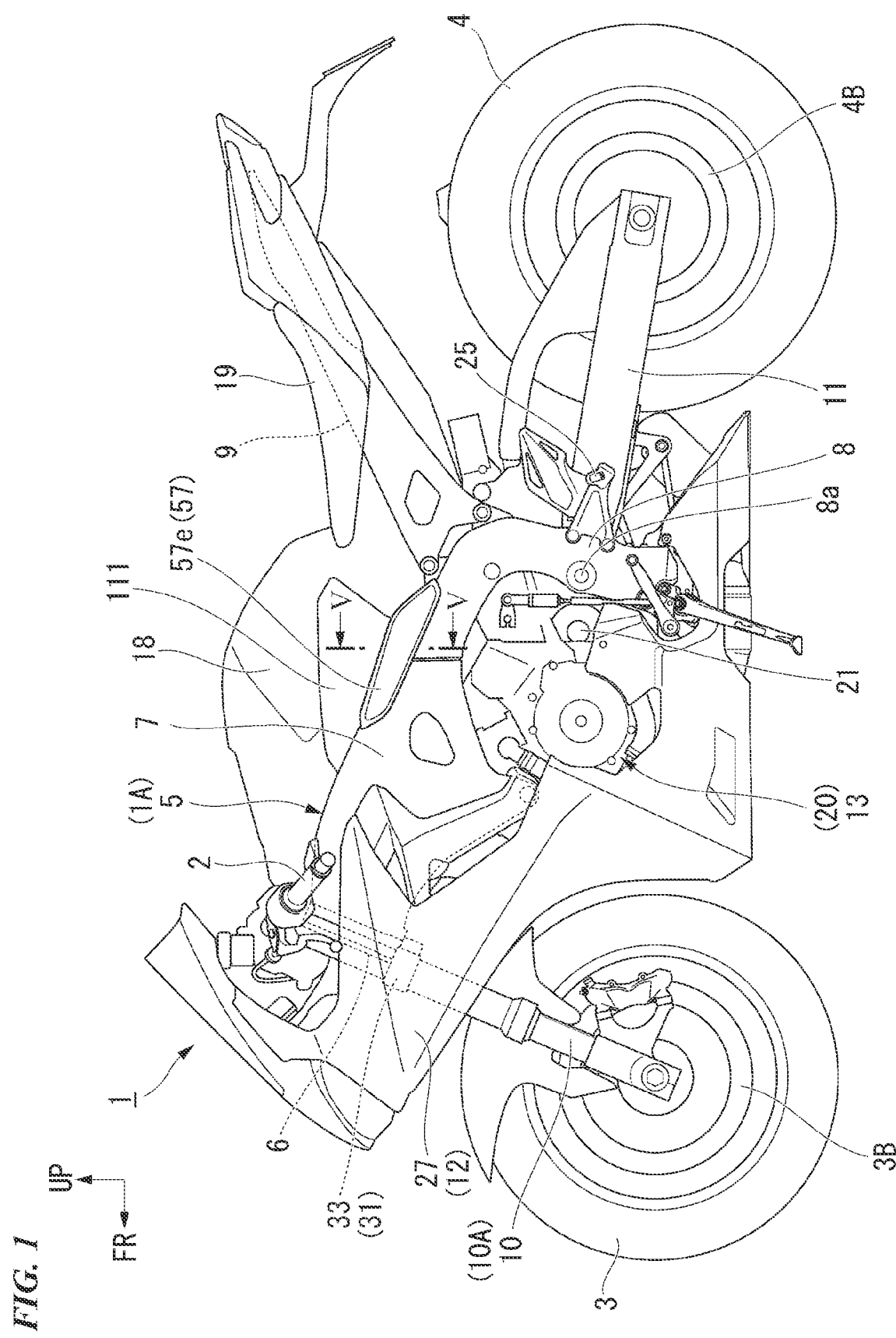
FIG. 1 is a left side view of a motorcycle of an embodiment of the present invention.

Hereinafter, an embodiment of the present invention will be described with reference to the drawings. In the following description, directions such as front, rear, left, and right are the same as the directions of the vehicle described below unless otherwise specified. An arrow FR indicating the front of the vehicle, an arrow LH indicating the left of the vehicle, and an arrow UP indicating the upper side of the vehicle are shown at appropriate locations in the drawings used in the following description.

<Whole Vehicle>

FIG. 1 shows a motorcycle 1 as an example of a vehicle of the embodiment. The motorcycle 1 includes a front wheel (steered wheel) 3 which is steered by a handle 2 and a rear wheel (driving wheel) 4 which is driven by a power unit 20. The motorcycle 1 is a saddle type vehicle in which a driver straddles a vehicle body. The motorcycle 1 is able to swing (bank) the vehicle body in the left and right direction (roll direction) based on ground contact points of the front and rear wheels 3 and 4. The vehicle of the embodiment is not limited to a vehicle that turns in a direction of banking a vehicle body like a motorcycle. The vehicle of the embodiment includes a vehicle that turns by steering a steered wheel without banking the vehicle body.

The motorcycle 1 includes a steering system component 10A having a handle 2 and a front wheel 3. The steering system component 10A is supported by a head pipe 6 to be steerable. The head pipe 6 is located at a front end portion of a vehicle body frame 5 that forms the skeleton of the motorcycle 1. The front wheel 3 is supported by lower end portions of a pair of left and right front forks 10 of the steering system component 10A. The vehicle body frame 5 is surrounded by a vehicle body cover 12. In the motorcycle 1, a vehicle body including a vehicle body frame 5 and the like (a vehicle body steerably supporting the steering system component 10A) is referred to as a vehicle body 1A.

The vehicle body frame 5 includes the head pipe 6, a pair of left and right main frames 7, a pair of left and right pivot frames 8, and a pair of left and right seat frames 9.

The head pipe 6 steerably supports the steering system component 10A. The left and right main frames 7 extend rearwardly downward from the head pipe 6. The left and right pivot frames 8 extend downward from the rear end portions of the left and right main frames 7 respectively. The left and right seat frames 9 extend rearwardly upward from the respective upper portions of the left and right pivot frames 8.

A pivot shaft 8a extending in the vehicle width direction is provided between the left and right pivot frames 8. The front end portion of the swing arm 11 is supported by the left and right pivot frames 8 through the pivot shaft 8a to swing up and down. The rear wheel 4 is supported by the rear end portion of the swing arm 11. A cushion unit (not shown) serving as a shock absorber is provided between the vehicle body frame 5 and the swing arm 11.

A fuel tank 18 is supported by the upper portions of the left and right main frames 7. A seat 19 is supported behind the fuel tank 18 by the left and right seat frames 9. A pair of left and right steps 25 on which the feet of the driver seated on the seat 19 are placed are arranged below the seat 19.

The power unit 20 of the motorcycle 1 is supported by the left and right main frames 7 and the left and right pivot frames 8. An output shaft of the power unit 20 is connected to the rear wheel 4 through a chain transmission mechanism (not shown) so that power can be transmitted.

The power unit 20 integrally includes an engine (internal combustion engine) 13 as a prime mover and a transmission 21 connected to the rear of the engine 13.

The motorcycle 1 includes a front wheel brake 3B which brakes the front wheel 3 and a rear wheel brake 4B which brakes the rear wheel 4. Each of the front wheel brake 3B and the rear wheel brake 4B is a disc brake.

The front wheel brake 3B and the rear wheel brake 4B appropriately brake the rotation of the front wheel 3 and the rear wheel 4 by operating a brake lever 43 and a brake pedal which are brake operators. Further, the front wheel brake 3B and the rear wheel brake 4B appropriately brake the rotation of the front wheel 3 and the rear wheel 4 by operating a brake actuator 102 (see FIG. 4) which will be described later.

The motorcycle 1 includes a driving assistance device 70 (see FIG. 4) that assists the driver's driving operation (in the embodiment, the steering operation for steering the front wheel 3 and the braking operation for braking the front wheel 3 and the rear wheel 4). The driving assistance device 70 includes a control device 71 that controls a function of automatically intervening in the driver's driving operation (automatic operation intervention function). The automatic operation intervention function includes an automatic steering intervention function and an automatic braking intervention function. The driving assistance device 70 will be described later.

Figure 2:
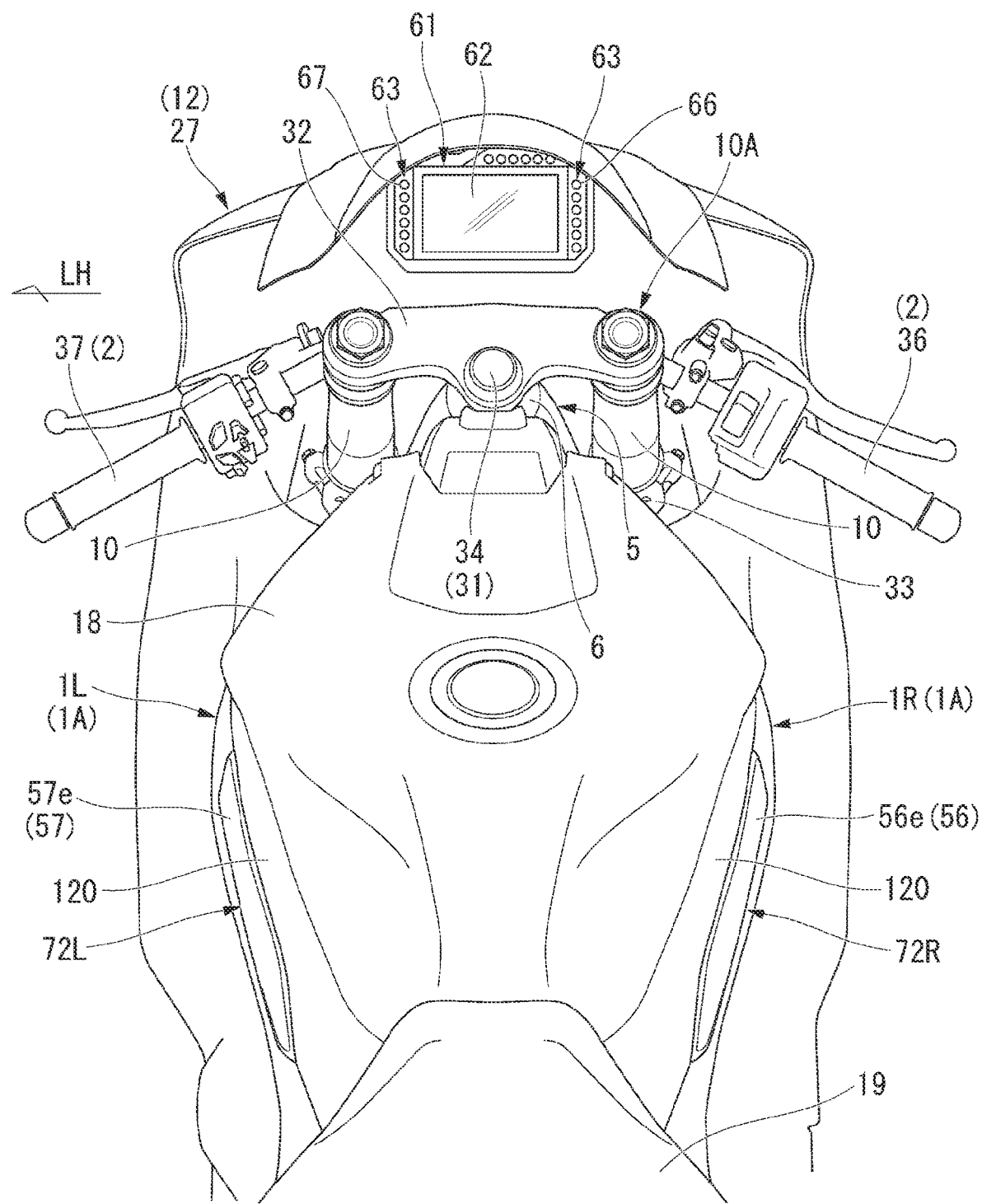
FIG. 2 is a perspective view of a front part of a vehicle body of the motorcycle when viewed from a driver's line of sight.

FIG. 2 shows the front part of the vehicle body when viewed from the driver's line of sight. The upper portions of the left and right front forks 10 are supported by the head pipe 6 through a steering stem 31. The left and right front forks 10 are telescopic shock absorbers. The steering stem 31 includes a top bridge 32 and a bottom bridge 33 which connect the upper portions of the left and right front forks 10 and a stem shaft (steering shaft) 34 which is inserted through the head pipe 6. The front part of the vehicle body is covered with a front cowl 27 of the vehicle body cover 12.

For example, the handle 2 of the motorcycle 1 is separate left and right handles, and includes a pair of left and right handles 36 and 37. For example, the right handle 36 and the left handle 37 are attached to the upper portions of the left and right front forks 10 below the top bridge 32, respectively.

Figure 5:
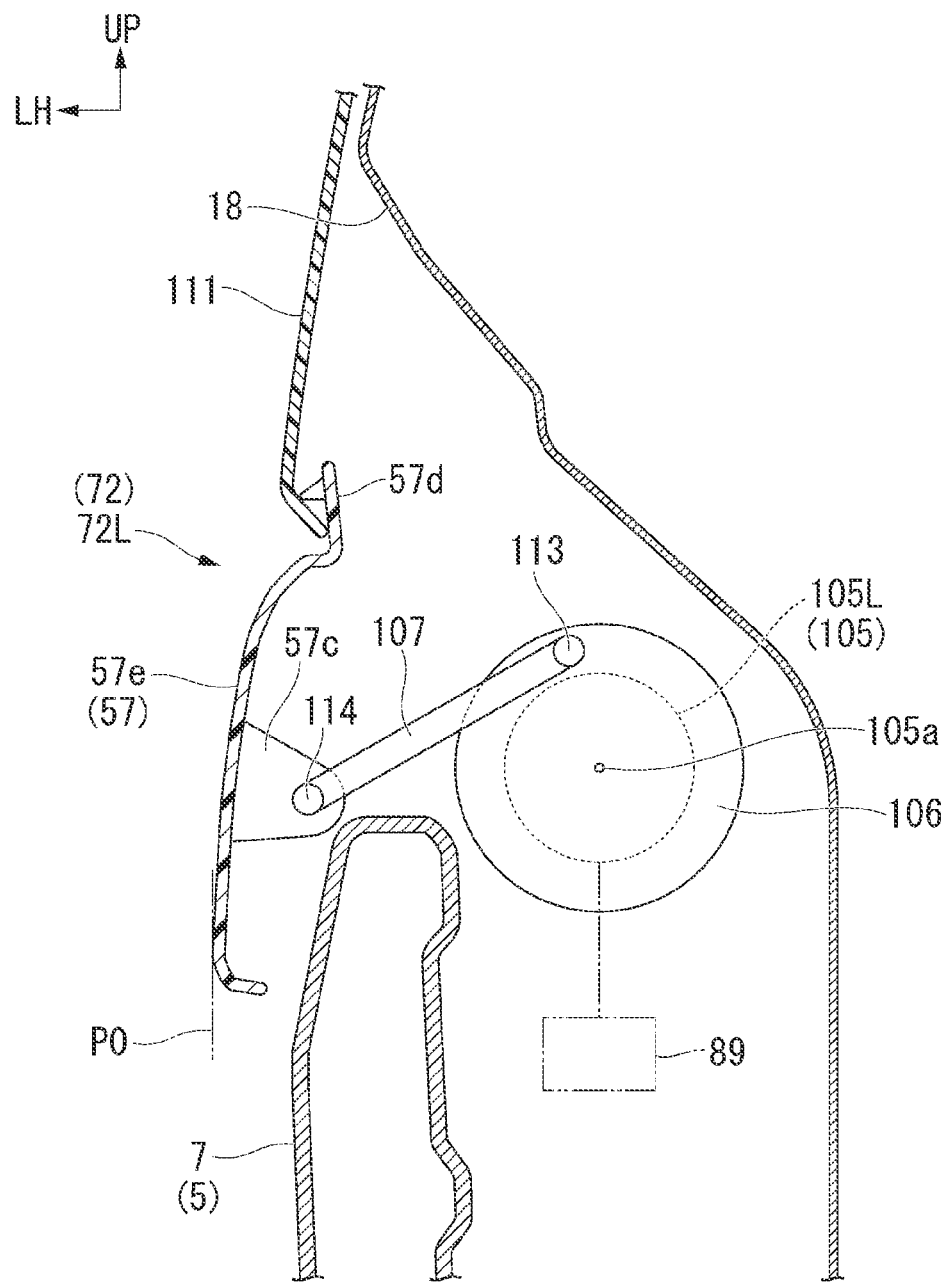
FIG. 5 is a cross-sectional view taken along a line V-V of FIG. 1 and shows a non-operation state of a left movable portion.

Referring to FIGS. 1 and 5, the vehicle body 1A includes a pair of left and right vehicle body outer portions 1L and 1R which faces the outside in the vehicle width direction. The left and right vehicle body outer portions 1L and 1R are provided with movable portions 56 and 57 which are operated by actuators 105L and 105R. The left and right movable portions 56 and 57 are arranged in front of the seat 19 and above the step 25. The driver's legs, which are seated on the seat 19 and put their feet on the steps 25, extend to the left and right outside of the fuel tank 18. For the legs, knees are bent on the left and right outside of the fuel tank and the lower legs are extended toward the steps 25. The movable portions 56 and 57 are arranged to overlap the legs when viewed from the side of the vehicle. The outer side surfaces (outer surfaces) 56e and 57e of the movable portions 56 and 57 facing outward in the vehicle width direction can come into contact with the driver's legs from the inside in the vehicle width direction.

The movable portions 56 and 57 function as means for notifying the driver's legs of predetermined information by operating the outer side surfaces 56e and 57e in a predetermined motion. In the embodiment, the movable portions 56 and 57 function as means for notifying the driver of information on the automatic operation intervention function. The movable portions 56 and 57 are operated to move the outer side surfaces 56e and 57e outward in the vehicle width direction. Each of the movable portions 56 and 57 is included in a leg pressing device 72 which presses the driver's leg inward in the vehicle width direction.

The leg pressing device 72 includes a right leg pressing portion 72R which is provided in the right vehicle body outer portion 1R, a left leg pressing portion 72L which is provided in the left vehicle body outer portion 1L, and a leg pressing control unit 89 to be described later (see FIG. 4). The right leg pressing portion 72R and the left leg pressing portion 72L can move (swing) a right movable portion (movable portion) 56 and a left movable portion 57 each having a plate shape along the outer side surface of the vehicle body in the vehicle width direction. The right movable portion 56 and the left movable portion 57 extend obliquely rearwardly downward along the upper edge of the main frame 7 when viewed from the side of the vehicle. The right movable portion 56 and the left movable portion 57 can contact the left and right legs (thighs, knees, and the like) of the driver from the inside in the vehicle width direction.

A position in which the right movable portion 56 and the left movable portion 57 are arranged in the vehicle body 1A is a position in which the driver sandwiches the vehicle body 1A with the left and right legs (so-called knee gripping position). The right vehicle body outer portion 1R and the left vehicle body outer portion 1L are provided with a pair of left and right leg grip portions 120 formed to align the left and right legs of the driver. The right movable portion 56 and the left movable portion 57 are respectively arranged at the left and right leg grip portions 120.

Thus, when the driver performs a knee gripping operation in a normal riding posture, the left and right legs of the driver naturally come into contact with the outer side surfaces 56e and 57e of the right movable portion 56 and the left movable portion 57. The right movable portion 56 and the left movable portion 57 are operated from an initial position P0 (see FIG. 5) to operation positions P1 and P2 (see FIGS. 6 and 7). The initial position P0 is a position in which the outer side surfaces 56e and 57e are arranged along the outer side surfaces of the vehicle body outer portions 1R and 1L. The operation positions P1 and P2 are positions in which the outer side surfaces 56e and 57e are moved (swung) outward in the vehicle width direction. When the right movable portion 56 and the left movable portion 57 are located at the operation positions P1 and P2, the left and right outer side surfaces 56e and 57e protrude outward in the vehicle width direction from the remaining general surfaces of the leg grip portion 120.

Figure 6:
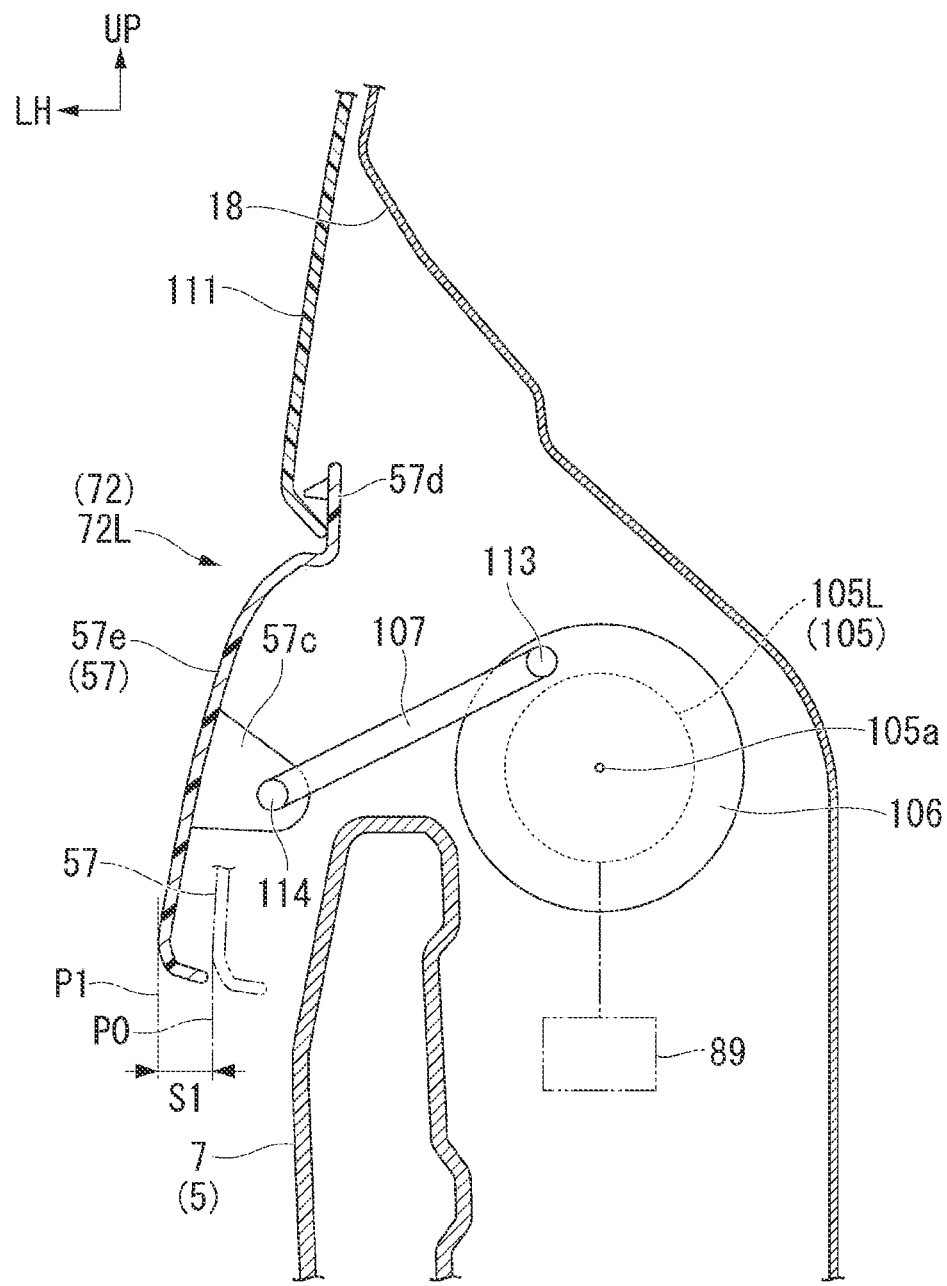
FIG. 6 is a cross-sectional view corresponding to FIG. 5 and showing a first operation state of the left movable portion.
Figure 7:
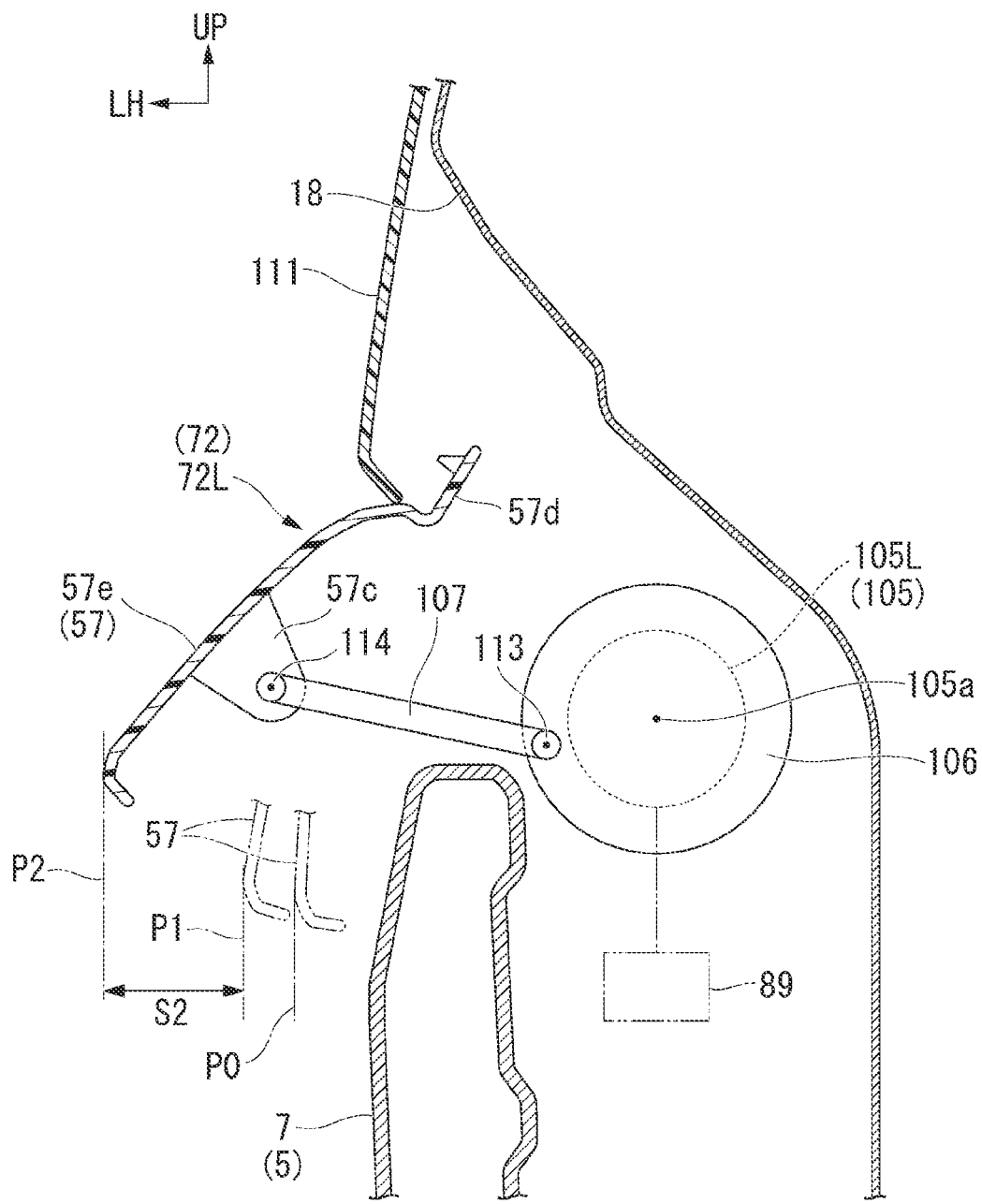
FIG. 7 is a cross-sectional view corresponding to FIG. 5 and showing a second operation state of the left movable portion.

The operation positions P1 and P2 include the first operation position P1 (see FIG. 6) and the second operation position P2 (see FIG. 7). The first operation position P1 is a position in which the outer side surfaces 56e and 57e are moved (swung) outward in the vehicle width direction by a first prescribed amount S1 from the initial position P0. The second operation position P2 is a position in which the outer side surfaces 56e and 57e are further moved (swung) outward in the vehicle width direction by a second prescribed amount S2 from the first operation position P1. The right movable portion 56 and the left movable portion 57 move (swing) outward in the vehicle width direction so that the driver's legs are pressed from the inside in the vehicle width direction. This pressing notifies the driver of information such as that the automatic operation intervention function is operating.

Referring to FIG. 2, a meter device 61 is disposed in front of a front fork 10. The meter device 61 is supported by the vehicle body frame 5 or a front cowl 27. The meter device 61 includes a display screen 62 such as a liquid crystal display which displays images of a vehicle speed and an engine rotation speed and an indicator lamp group 63 which is arranged around the display screen 62 and notifies various information.

The indicator lamp group 63 includes a right indicator lamp (display device) 66 which is disposed on the right side of the display screen 62 and a left indicator lamp (display device) 67 which is disposed on the left side of the display screen 62. The right indicator lamp 66 emits light while being interlocked with the operation of the right movable portion 56. The left indicator lamp 67 emits light while being interlocked with the operation of the left movable portion 57. The display screen 62 notifies the driver of predetermined information by displaying a predetermined image. The indicator lamp group 63 notifies the driver of predetermined information in advance by performing predetermined light-emitting display (lighting or blinking).

Figure 3:
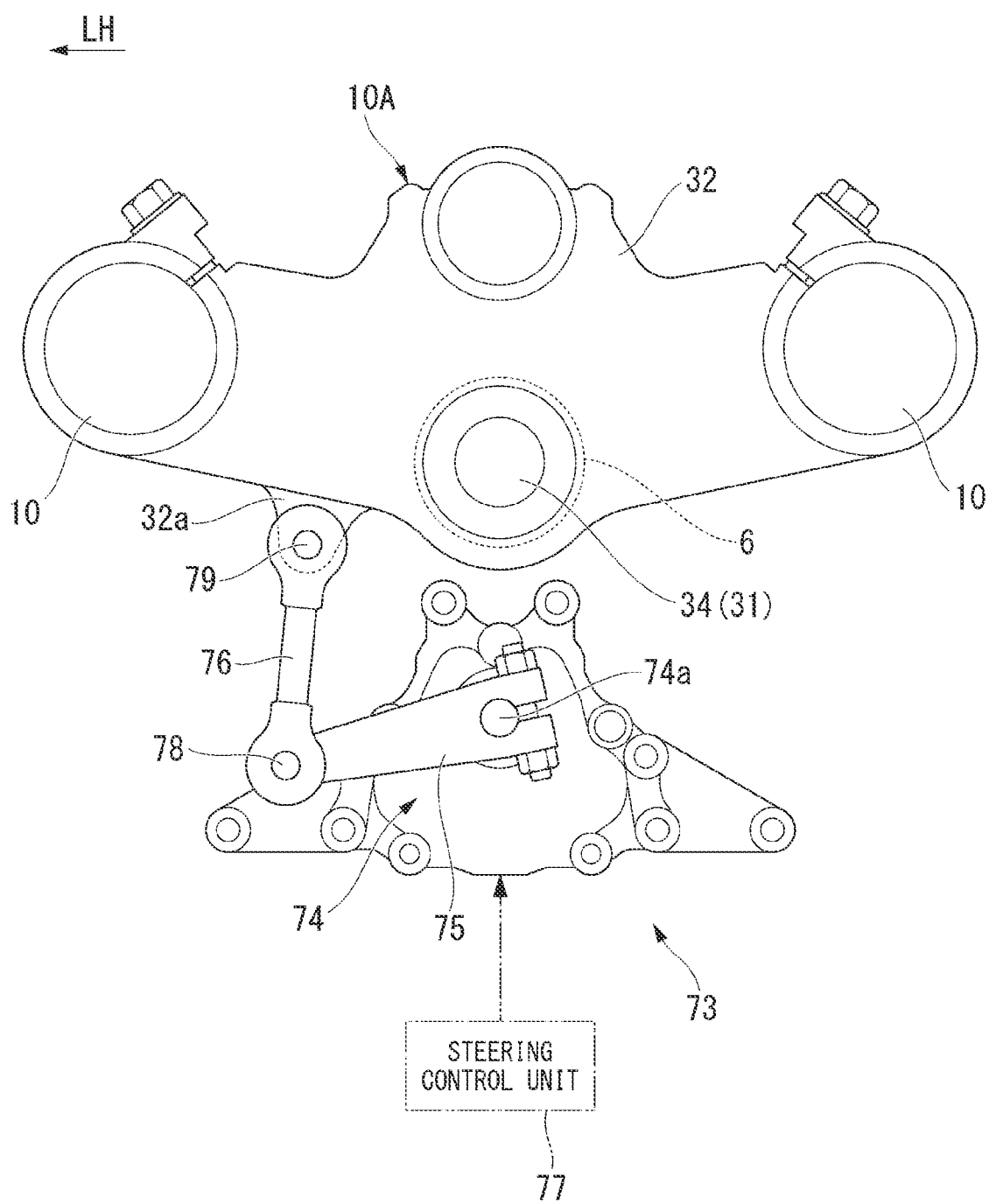
FIG. 3 is an explanatory diagram of a steering actuator of the motorcycle.

FIG. 3 shows the periphery of the top bridge 32 when viewed from above in the axial direction of the stem shaft 34.

A steering input is automatically applied to the steering system component 10A by a steering assist device 73 separately from the operation of the handle 2 by the driver.

The steering assist device 73 includes a steering actuator 74, an arm 75, a connecting rod 76, and a steering control unit 77.

The steering actuator 74 includes an electric motor which is a drive source of the automatic steering intervention function. The steering actuator 74 is fixed to, for example, the vehicle body frame 5. A base end portion of the arm 75 is fixed to a drive shaft 74a which is an output shaft of the steering actuator 74 to be rotatable together. One end portion of the connecting rod 76 is swingably connected to the tip portion of the arm 75 through a first connecting pin 78. The other end portion of the connecting rod 76 is swingably connected to a rod connecting portion 32a provided on the top bridge 32 through a second connecting pin 79.

The operation of the steering actuator 74 is controlled by the steering control unit 77. The output of the steering actuator 74 (the rotation torque of the drive shaft 74a) is transmitted to the top bridge 32 through the arm 75 and the connecting rod 76. Accordingly, the steering actuator 74 generates a steering torque (assist torque) in the steering system component 10A.

<Driving Assistance Device>

Figure 4:
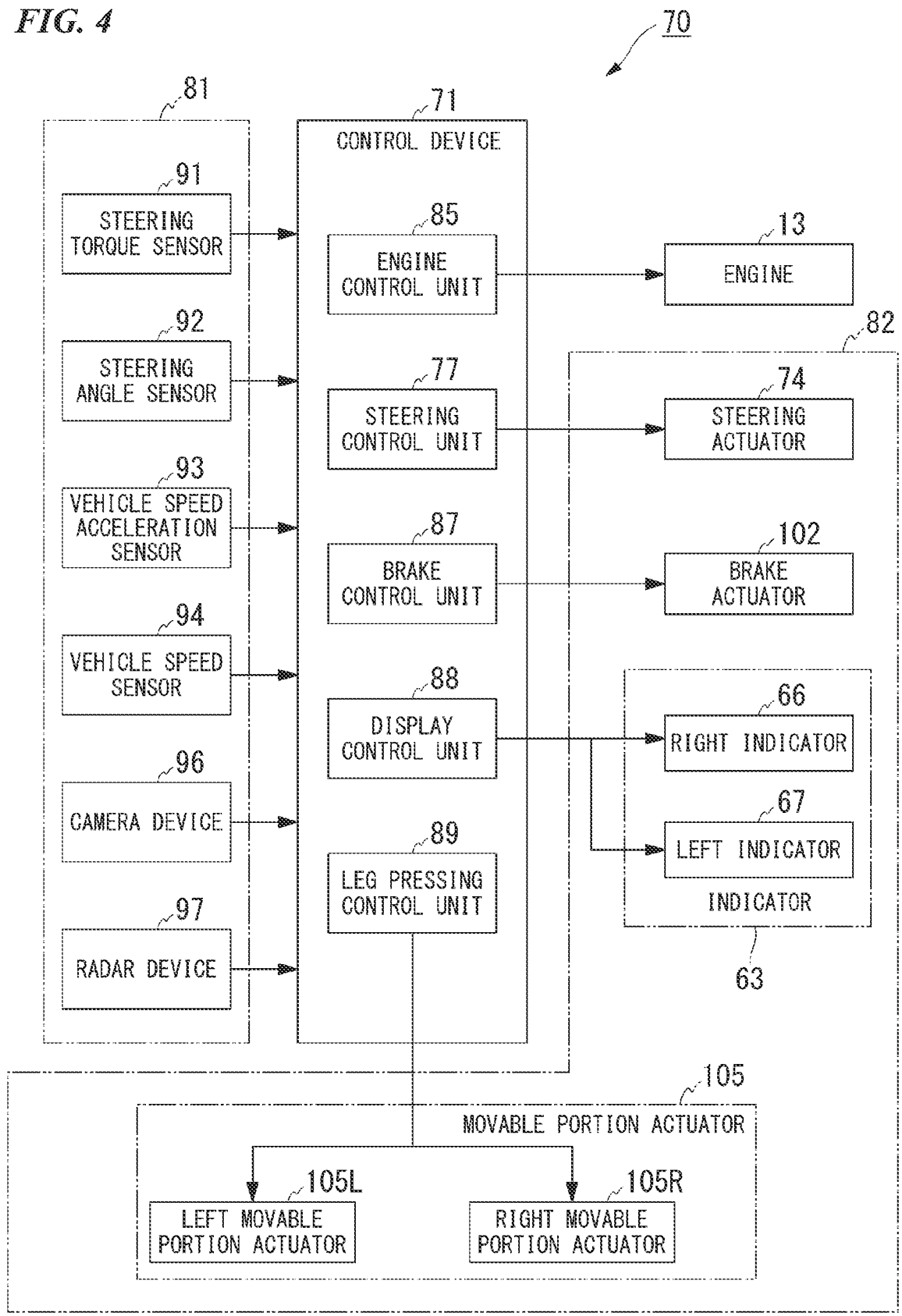
FIG. 4 is a block diagram of a driving assistance device of the motorcycle.

As shown in FIG. 4, the driving assistance device 70 includes a control device 71, various sensors 81, and various devices 82. The control device 71 controls the operation of various devices 82 based on the detection information acquired from various sensors 81.

The control device 71 is composed of, for example, a single or a plurality of electronic control units (ECUs). At least a part of the control device 71 may be realized by cooperation of software and hardware.

The control device 71 includes an engine control unit 85, a steering control unit 77, a brake control unit 87, a display control unit 88, and a leg pressing control unit 89.

Various sensors 81 include a steering torque sensor 91, a steering angle sensor 92, a vehicle body acceleration sensor 93, a vehicle speed sensor 94, a camera device 96, and a radar device 97.

The steering torque sensor 91 is, for example, a magnetostrictive torque sensor provided between the handle 2 and the steering system component 10A other than the handle 2. The steering torque sensor 91 detects a torsional torque (steering input) input from the handle 2 to the other steering system components 10A.

The steering angle sensor 92 is, for example, a potentiometer provided on the steering shaft (stem shaft 34). The steering angle sensor 92 detects the turning angle (steering angle) of the steering shaft with respect to the vehicle body.

The vehicle body acceleration sensor 93 is a 5-axis or 6-axis inertial measurement unit (IMU). The vehicle body acceleration sensor 93 detects the angular velocities of the three axes (roll axis, pitch axis, and yaw axis) of the vehicle body and further can estimate the angle and acceleration from the results.

The vehicle speed sensor 94 detects, for example, the rotation speed of the output shaft of the power unit 20. The vehicle speed sensor 94 can detect the rotation speed of the rear wheel 4 and further the vehicle speed of the motorcycle 1 from the rotation speed.

The camera device 96 includes a camera using a solid-state imaging device such as CCD or CMOS. The camera device 96, for example, periodically photographs the surroundings of the motorcycle 1 (for example, front, rear, left, and right) using the camera. The camera device 96 generates image data from the captured image through image processing such as filtering and binarization.

The radar device 97 radiates radio waves such as millimeter waves around the motorcycle 1. The radar device 97 detects radio waves (reflected waves) reflected by an object around the vehicle. The radar device 97 can detect at least the front, rear, left, and right positions of the object with respect to the motorcycle 1 (distance and orientation with respect to the motorcycle 1) and the speed.

Information from the camera device 96 and the radar device 97 described above is used to recognize the position, type, speed, and the like of an object in the detection direction. Based on this recognition, driving assistance control, automatic driving control, and the like of the motorcycle 1 are performed.

Various devices 82 include the steering actuator 74, the brake actuator 102, the indicator lamp group 63, and the movable portion actuator 105.

The steering actuator 74 generates a steering torque for steering the front wheel 3 independently of the operation of the handle 2 by the driver. The steering actuator 74 may also serve as a steering damper.

The brake actuator 102 operates the front wheel brake 3B and the rear wheel brake 4B by supplying a hydraulic pressure to the front wheel brake 3B and the rear wheel brake 4B separately from the operation of the brake operator by the driver. The brake actuator 102 may also serve as an anti-lock brake system (ABS) control unit. The brake actuator 102 may be connected to a brake line branched from the normal brake circuit.

The indicator lamp group 63 includes a right indicator lamp 66 and a left indicator lamp 67. The right indicator lamp 66 and the left indicator lamp 67 emit light while being interlocked with the operation of the movable portion actuator 105.

The movable portion actuator 105 includes the right movable portion actuator 105R and the left movable portion actuator 105L. The right movable portion actuator 105L drives the right movable portion 56 provided at the right portion of the vehicle body. The left movable portion actuator 105L drives the left movable portion 57 provided at the left portion of the vehicle body.

Next, the control device 71 will be described.

The engine control unit 85 controls the output of the engine 13 based on the throttle opening, intake negative pressure, fuel injection amount, valve timing, ignition timing, and the like in the engine 13. Further, the vehicle speed of the motorcycle 1 is changed according to the crankshaft rotation speed of the engine 13 and the gear ratio of the transmission 21 by controlling the output of the engine 13.

The steering control unit 77 controls the operation of the steering actuator 74 based on the following signals and information. The signals and information are the steering torque signal detected by the steering torque sensor 91, the angular velocity signal detected by the vehicle body acceleration sensor 93, the vehicle speed signal detected by the vehicle speed sensor 94, the detection information detected by the camera device 96 and the radar device 97, and the like. Accordingly, the assist torque is applied to the steering system component 10A. By this assist torque, the steering of the front wheel 3 which is a steered wheel is assisted. In this way, the steering control unit 77 controls the automatic steering intervention function.

The brake control unit 87 controls the operation of the brake actuator 102 based on the engine output, the vehicle speed signal detected by the vehicle speed sensor 94, the detection information detected by the camera device 96 and the radar device 97, and the like. Accordingly, the front wheel brake 3B and the rear wheel brake 4B generate an assist braking force. By this assist braking force, the braking of the front wheel 3 and the rear wheel 4 is assisted. In this way, the brake control unit 87 controls the automatic braking intervention function.

The display control unit 88 controls the light emission (lighting or blinking) of the right indicator lamp 66 and the left indicator lamp 67 in accordance with the control of the following functions. The above-described function control includes the control of the automatic steering intervention function by the steering control unit 77 and the control of the automatic braking intervention function by the brake control unit 87.

The leg pressing control unit 89 controls the operation of the right movable portion actuator 105R and the left movable portion actuator 105L in accordance with the following function control. The function control includes the control of the automatic steering intervention function by the steering control unit 77 and the control of the automatic braking intervention function by the brake control unit 87. When the operation of the right movable portion actuator 105R and the left movable portion actuator 105L is controlled, the movement of the right movable portion 56 and the left movable portion 57 toward the outside in the vehicle width direction is controlled.

The display control unit 88 and the leg pressing control unit 89 are synchronously controlled when the steering actuator 74 and the brake actuator 102 are operated.

The engine control unit 85, the steering control unit 77, the brake control unit 87, the display control unit 88, and the leg pressing control unit 89 described above all include microcomputers and are configured to communicate with each other.

<Leg Pressing Portion>

Hereinafter, the configuration of the left leg pressing portion 72L shown in FIGS. 5 to 7 will be described. Since the right leg pressing portion 72R has a symmetrical configuration, the description thereof will be omitted.

The left leg pressing portion 72L includes the left movable portion actuator (actuator) 105L, a disc 106, a link member 107, and the left movable portion 57.

The left movable portion actuator 105L is an electric motor which is disposed between the upper edge of the main frame 7 and the fuel tank 18. The left movable portion actuator 105L is fixed to the main frame 7 or the fuel tank 18. For example, the electric motor is a stepping motor which can control a rotation angle of a rotating shaft 105a at a predetermined angle. For example, when the rotating shaft 105a is stopped at a predetermined rotation angle, the electric motor has a holding force of holding the rotating shaft 105a at that rotation angle. The disc 106 is attached to the rotating shaft 105a of the left movable portion actuator 105 to be rotatable together. The rotating shaft 105a extends in the front and rear direction of the vehicle.

The upper end portion of the left movable portion 57 is supported by the lower end portion of a tank side cover 111. The tank side cover 111 is disposed above the main frame 7. The left movable portion 57 is swingably supported with an upper edge extending in the front and rear direction of the vehicle (extending along the upper edge of the main frame 7) as a fulcrum. The outer side surface 57e of the left movable portion 57 can contact the leg of the driver riding the motorcycle 1 from the inside in the vehicle width direction.

The left movable portion 57 shown in FIG. 5 is at the position in which the left movable portion is swung most inward in the vehicle width direction. The position of the left movable portion 57 at this time is referred to as an initial position P0 or a closed position.

A link connection portion 57c is provided on the inside of the left movable portion 57 in the vehicle width direction. The disc 106 is connected to the link connection portion 57c through the link member 107. One end portion of the link member 107 is swingably connected to the outer peripheral portion of the disc 106 by a first support shaft 113. The other end portion of the link member 107 is swingably connected to the link connection portion 57c of the left movable portion 57 by a second support shaft 114.

Additionally, the right movable portion actuator (actuator) 105R of the right leg pressing portion 72R is shown in the block diagram of FIG. 4. The right movable portion actuator 105R is an electric motor having the same structure as that of the left movable portion actuator 105L. The right movable portion 57 has the outer side surface 56e that is able to contact the leg of the driver riding on the vehicle.

As shown in FIG. 6, when the left movable portion actuator 105L is operated from the state of FIG. 5 in the left leg pressing portion 72L, the following operations occur. That is, the disc 106 rotates in the direction of the arrow A together with the rotating shaft 105a of the left movable portion actuator 105L.

In accordance with this rotation, the link member 107 is pressed outward in the vehicle width direction so that the left movable portion 57 is pressed outward in the vehicle width direction. As a result, the left movable portion 57 swings with the upper end portion as the swing fulcrum and moves as below. That is, the left movable portion 57 moves from the initial position P0 (closed position) indicated by the two-dotted chain line in FIG. 5 to the first operation position P1 (LOW position) indicated by the solid line. The left movable portion 57 protrudes outward in the vehicle width direction by a first prescribed amount S1 when swinging from the initial position P0 to the first operation position P1.

As shown in FIG. 7, when the left movable portion actuator 105L is further operated from the state of FIG. 6 in the left leg pressing portion 72L, the following operation occurs. That is, the disc 106 further rotates in the direction of the arrow A together with the rotating shaft 105a of the left movable portion actuator 105L.

In accordance with this rotation, the link member 107 is further pressed outward in the vehicle width direction so that the left movable portion 57 is further pressed outward in the vehicle width direction. As a result, the left movable portion 57 further swings with the upper end portion as the swing fulcrum and moves as follow. That is, the left movable portion 57 moves from the first operation position P1 (LOW position) indicated by the two-dotted chain line in FIG. 6 to the second operation position P2 (HIGH position) indicated by the solid line. The left movable portion 57 protrudes outward in the vehicle width direction by a second prescribed amount S2 when swinging from the first operation position P1 to the second operation position P2. For example, the second operation position P2 is a position in which the left movable portion 57 protrudes maximum outward in the vehicle width direction.

The left movable portion 57 (and the right movable portion 56) can move in two stages of the LOW position in which the outward protrusion amount in the vehicle width direction is small and the HIGH position in which the outward protrusion amount in the vehicle width direction is large. Accordingly, it is possible to notify the driver of a plurality of different types of information regarding the automatic operation intervention function.

Additionally, the operation of the left movable portion 57 (and the right movable portion 56) to give a tactile stimulus to the driver's legs is not limited to swinging with the upper end portion as the swinging fulcrum. For example, the left movable portion 57 (and the right movable portion 56) may swing with the lower end portion and the front and rear end portions as swing fulcrums. Further, the left movable portion 57 (and the right movable portion 56) may generally translate as a whole, perform various other operations, vibrate the outer side surfaces 56e and 57e, or combine a plurality of the various operations described above.

The operation of the left and right leg pressing portions 72L and 72R described above will be described.

First, when the system of the driving assistance device 70 is not activated, the right movable portion 56 and the left movable portion 57 are arranged at the initial position P0 as shown in FIG. 5. That is, the right movable portion 56 and the left movable portion 57 are arranged along the outer surfaces of the right vehicle body outer portion 1R and the left vehicle body outer portion 1L of the motorcycle 1. The right movable portion 56 and the left movable portion 57 at the initial position P0 are in the following states in the right vehicle body outer portion 1R and the left vehicle body outer portion 1L. That is, the right movable portion 56 and the left movable portion 57 form a substantially continuous outer surface together with vehicle body components such as the main frame 7, the fuel tank 18, and other vehicle body covers.

The right movable portion 56 and the left movable portion 57 are located at a position (so-called knee grip position) in which the driver sandwiches the vehicle body 1A at the left and right legs. When the driving assistance device 70 is not activated, the right movable portion 56 and the left movable portion 57 do not protrude on the outer surfaces of the right vehicle body outer portion 1R and the left vehicle body outer portion 1L. Therefore, the driver can drive comfortably without being particularly aware of the presence of the right movable portion 56 and the left movable portion 57 when the right vehicle body outer portion 1R and the left vehicle body outer portion 1L perform a knee gripping operation.

Next, a non-operation state in which the system of the driving assistance device 70 is activated and the automatic operation intervention function is not operated yet (hereinafter, referred to as a standby state) will be described. At this time, as shown in FIG. 6, the right movable portion 56 and the left movable portion 57 are arranged to protrude outward in the vehicle width direction by the first prescribed amount S1 from the outer surfaces of the right vehicle body outer portion 1R and the left vehicle body outer portion 1L of the motorcycle 1.

In the standby state, the right movable portion 56 and the left movable portion 57 repeat the reciprocating movement between the initial position P0 and the first operation position P1. The first operation position P1 is a position that protrudes outward in the vehicle width direction by the first prescribed amount S1 from the initial position P0. Therefore, the driver is aware of the presence of the right movable portion 56 and the left movable portion 57 on the left and right legs that perform a knee gripping operation on the right vehicle body outer portion 1R and the left vehicle body outer portion 1L. Therefore, the driver can recognize that the driving assistance device 70 is activated.

Next, the operation states of the steering intervention function and the braking intervention function of the automatic operation intervention function from the standby state of the driving assistance device 70 will be described. At this time, as shown in FIG. 7, at least one of the right movable portion 56 and the left movable portion 57 is disposed to protrude further outward in the vehicle width direction from the first operation position P1. At this time, the right movable portion 56 and the left movable portion 57 are located at the second operation position P2 that protrudes further outward in the vehicle width direction by the second prescribed amount S2 from the first operation position P1.

Accordingly, the driver can recognize that the automatic operation intervention function is operated by detecting the movement of at least one of the right movable portion 56 and the left movable portion 57.

In the embodiment, at least one of the right movable portion 56 and the left movable portion 57 is maintained in a state having moved to the second operation position P2 when the automatic operation intervention function is operated. However, the driving assistance device is not limited to this configuration. For example, at least one of the right movable portion 56 and the left movable portion 57 may repeat the reciprocating movement between the first operation position P1 and the second operation position P2 when the automatic operation intervention function is operated.

The operation of the driving assistance device 70 described above will be described.

Figure 8:
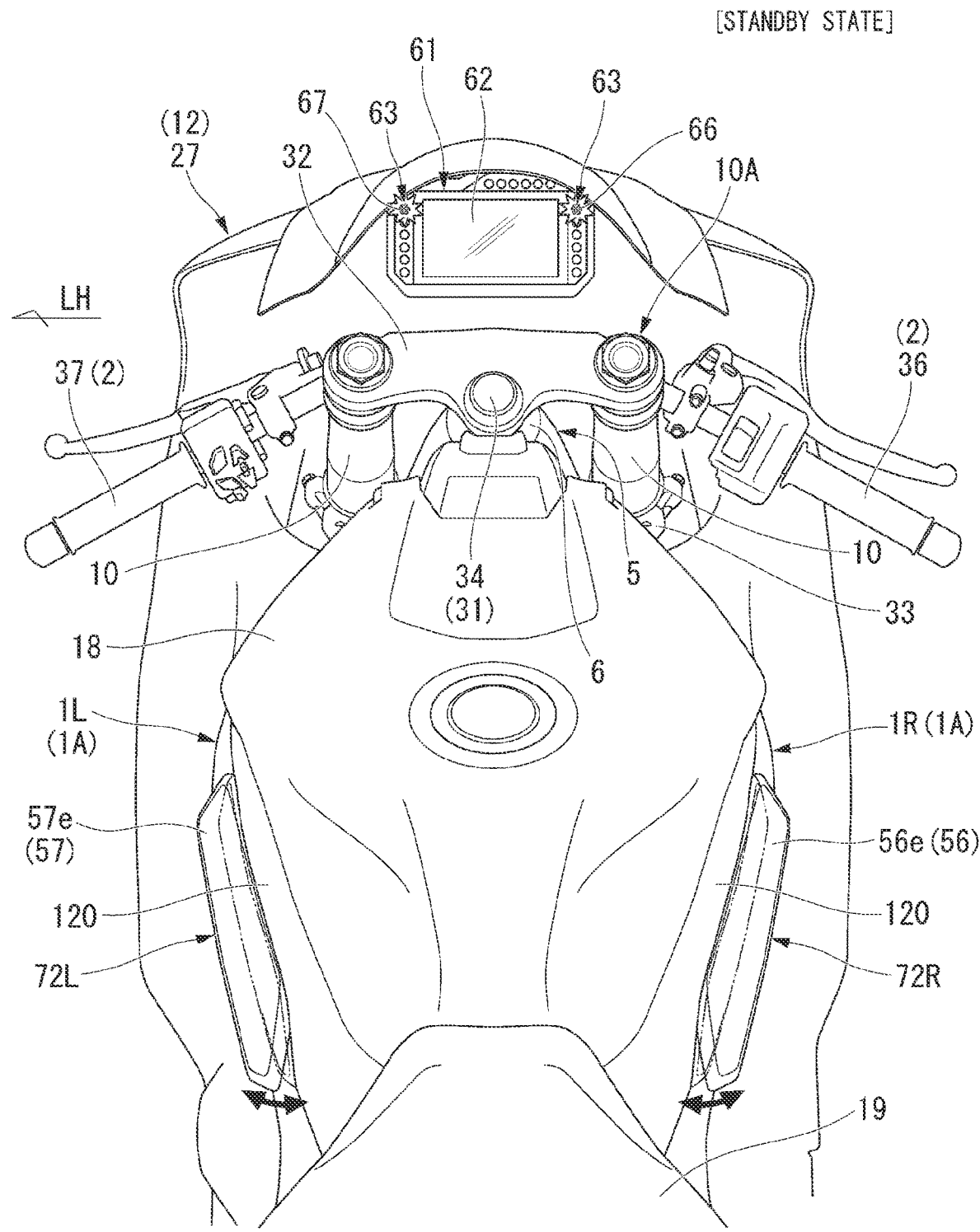
FIG. 8 is an explanatory diagram of an operation in a standby state of the driving assistance device.

FIG. 8 shows a standby state in which the system of the driving assistance device 70 is activated and the automatic operation intervention function is not operated yet. In the standby state, the main switch (power supply) of the motorcycle 1 is turned on and the operation switch of the driving assistance device 70 is turned on so that the operation of the automatic operation intervention function is allowed. In the standby state, various sensors 81 monitor various parameters and the like for operating the automatic operation intervention function. Based on this monitoring information, the automatic operation intervention function can be operated immediately.

In the standby state, the right movable portion 56 of the right leg pressing portion 72R and the left movable portion 57 of the left leg pressing portion 72L are operated in a synchronized manner. At this time, the right movable portion 56 and the left movable portion 57 perform one reciprocating movement (swing) in the vehicle width direction. Specifically, the right movable portion 56 and the left movable portion 57 perform the forward movement from the initial position P0 (closed position) to the first operation position P1 (LOW position) and the backward movement from the first operation position P1 to the initial position P0.

Further, at this time, the right indicator lamp 66 and the left indicator lamp 67 of the meter device 61 emit light (blinking) in synchronization with the operation of the right movable portion 56 and the left movable portion 57. Specifically, the right indicator lamp 66 and the left indicator lamp 67 emit light when the right movable portion 56 and the left movable portion 57 reach the first operation position P1 from the initial position P0. Further, the right indicator lamp 66 and the left indicator lamp 67 are extinguished when returning from the first operation position P1 to the initial position P0. The blinking period of the right indicator lamp 66 and the left indicator lamp 67 in the standby state (which is also the operation period of the left and right movable portions 56 and 57) is set as a first period.

In this way, a tactile stimulus is applied to the driver's legs and a visual sense is also used to notify the driver that the system is activated.

Figure 9:
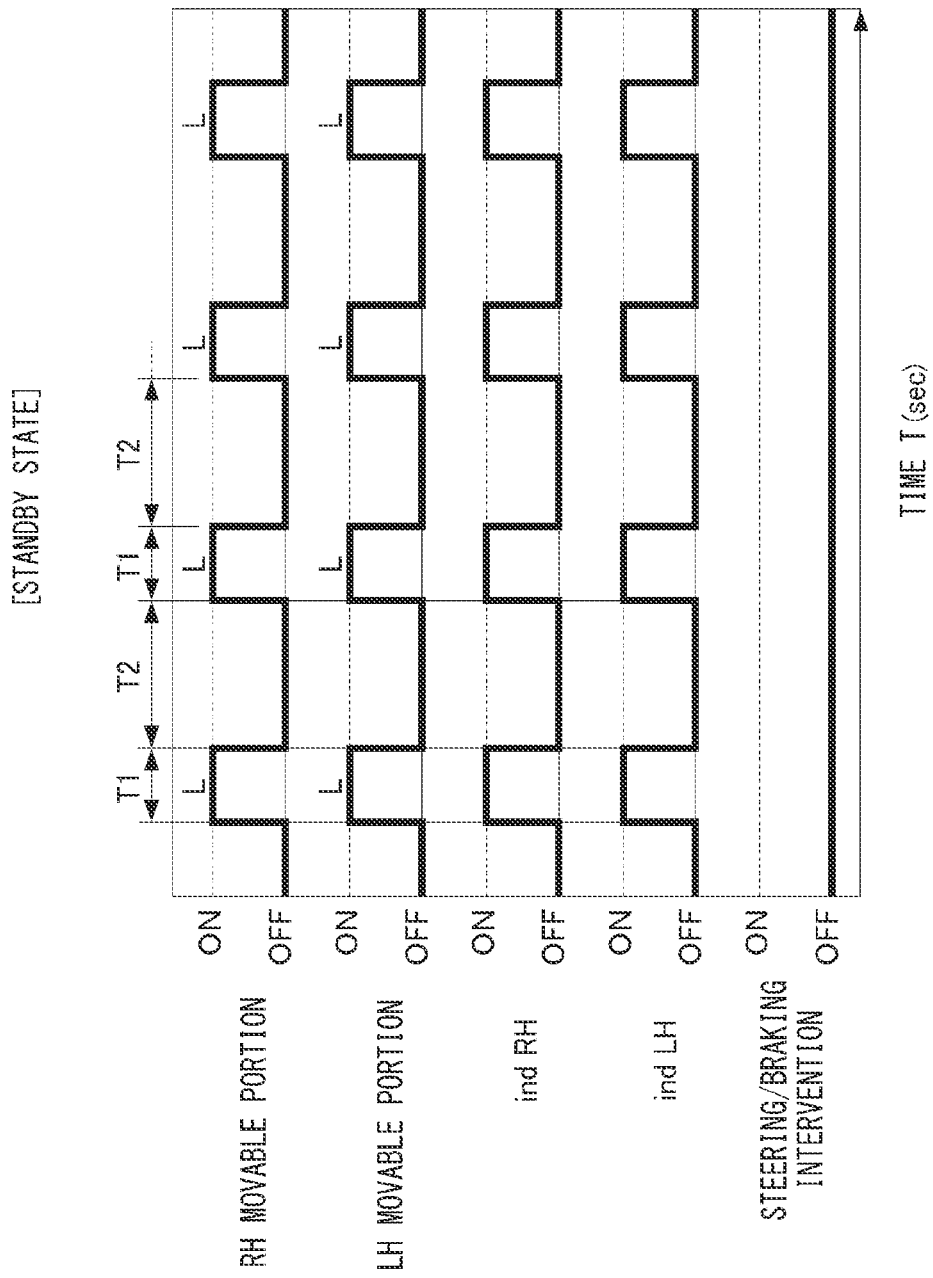
FIG. 9 is a graph showing temporal changes in the operation of various devices in the standby state of the driving assistance device.

FIG. 9 shows the time course of the operation of the movable portion actuator 105 and the like in the standby state.

The vertical axis of the graph of FIG. 9 indicates the operation states (ON (operation) and OFF (non-operation)) of the actuators 105L and 105R of the left and right movable portions 56 and 57 and the left and right indicator lamps 66 and 67. The vertical axis also indicates the operating state (ON and OFF) of the steering or braking intervention.

In the operation state of the left and right actuators 105L and 105R, a case in which the left and right movable portions 56 and 57 are located at the closed position is an OFF state and a case in which the left and right movable portions are located at the LOW position and the HIGH position is an ON state. Further, a case in which the left and right movable portions 56 and 57 are located at the LOW position is indicated by "L" in the graph and a case in which the left and right movable portions are located at the HIGH position is indicated by "H" in the graph. The horizontal axis of the graph indicates the time T (sec).

In the drawing, "RH movable portion" indicates the right movable portion actuator 105R and "LH movable portion" indicates the left movable portion actuator 105L, respectively. Further, "indRH" indicates the right indicator lamp 66 and "indLH" indicates the left indicator lamp 67, respectively. Additionally, also in the graphs of FIGS. 11, 13, and 15, the vertical axis and the horizontal axis are the same as those of the graph shown in FIG. 9.

In the above-described standby state, the right movable portion actuator 105R and the left movable portion actuator 105L are intermittently operated at the same timing. In the standby state, the right movable portion actuator 105R and the left movable portion actuator 105L perform an operation to open the left and right movable portions 56 and 57 from the initial position P0 to the first operation position P1. This operation is performed only for a predetermined time T1 (for example, 0.5 to 1 second). In the standby state, the right movable portion actuator 105R and the left movable portion actuator 105L perform an operation of opening the left and right movable portions 56 and 57. This operation is repeated at intervals of a predetermined time T2 (for example, about 2 seconds).

The right movable portion 56 and the left movable portion 57 which are opened outward in the vehicle width direction from the initial position P0 contact and press the left and right legs (thighs, knees, and the like) of the driver from the inside in the vehicle width direction. In the standby state, the right movable portion 56 and the left movable portion 57 move to the LOW position protruding from the surrounding leg grip portion 120. At this time, the right movable portion 56 and the left movable portion 57 open the left and right legs of the driver outward in the vehicle width direction rather than being positioned at the closed position. As a result, the driver recognizes the standby state from the operation of the right movable portion 56 and the left movable portion 57.

At this time, the right movable portion 56 and the left movable portion 57 move outward in the vehicle width direction and press the left and right legs of the driver, so that the reaction increases the force with which the driver sandwiches the vehicle body. Further, at this time, an action occurs in which the driver strongly sandwiches the vehicle body against the pressure. As a result, the left and right legs of the driver are able to hold the vehicle body more firmly and the riding posture is suitable for the automatic operation intervention function.

Further, the right indicator lamp 66 and the left indicator lamp 67 blink in synchronization with the intermittent operation of the right movable portion 56 and the left movable portion 57. That is, the right indicator lamp 66 and the left indicator lamp 67 repeat the light emission of the time T1 with a time interval of the time T2. In this way, the right movable portion 56 and the left movable portion 57 are interlocked with the right indicator lamp 66 and the left indicator lamp 67.

In the standby state, the steering intervention function and the braking intervention function of the automatic operation intervention function are not operated and are in an OFF state.

Figure 10:
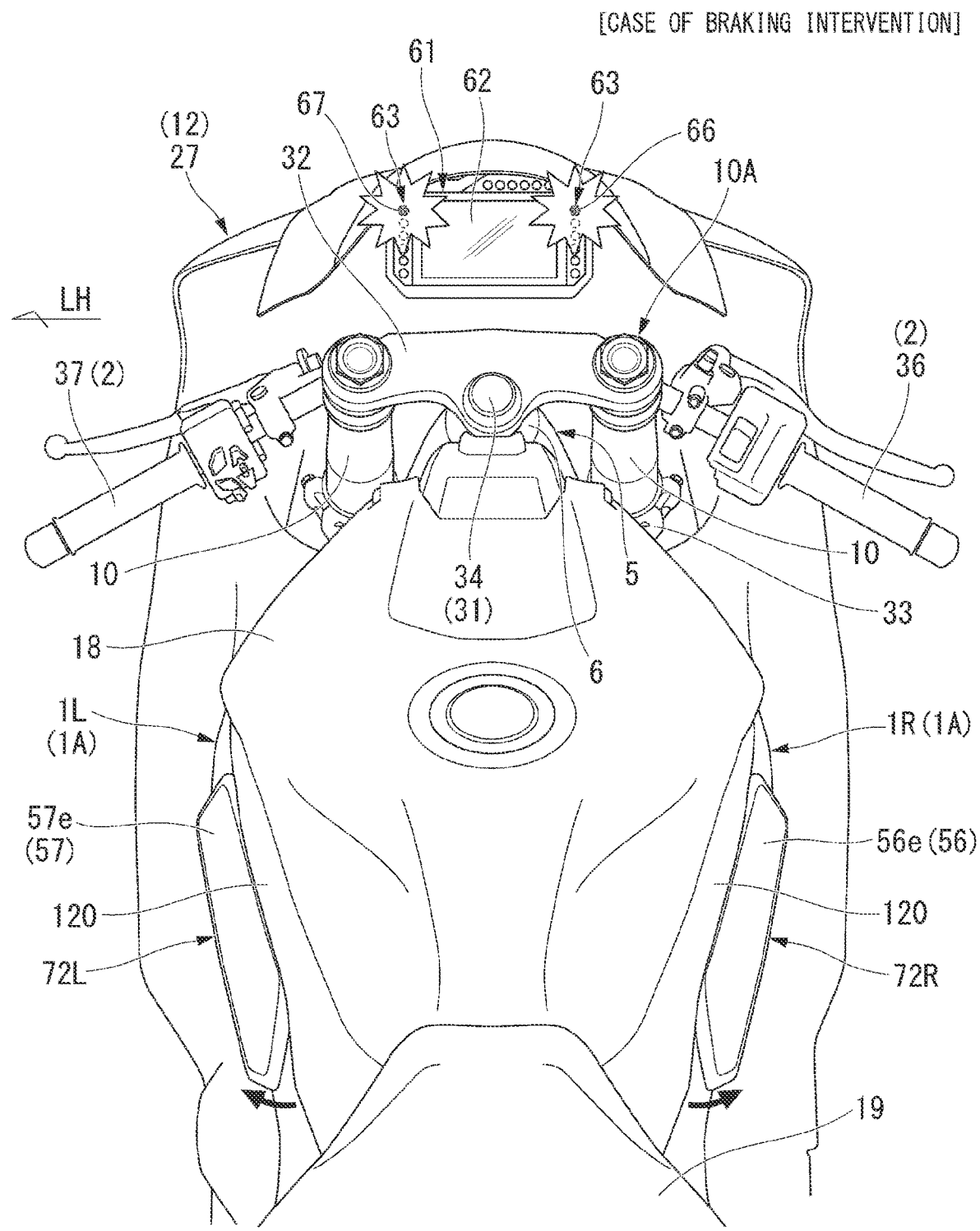
FIG. 10 is an explanatory diagram of an operation when a braking intervention operation of the driving assistance device is operated.

FIG. 10 shows a state in which the driving assistance device 70 operates the automatic braking intervention function from the standby state to brake the motorcycle 1.

Since the automatic braking intervention function of the embodiment has no relation in the left and right direction, both the right movable portion 56 and the left movable portion 57 are operated. At this time, both the right movable portion 56 and the left movable portion 57 are moved from the closed position to the HIGH position. Since it is assumed that the automatic braking intervention function provokes the physical behavior of the driver in an urgent state, both the right movable portion 56 and the left movable portion 57 are operated. At this time, the right movable portion 56 and the left movable portion 57 are not intermittently operated, but continuously operated without time intervals.

Further, both the right indicator lamp 66 and the left indicator lamp 67 emit light (blink) while the right movable portion 56 and the left movable portion 57 are operated. This light emission is not limited to blinking and may be lighting interlocked with the operation of the right movable portion 56 and the left movable portion 57.

When the above-described automatic braking intervention function is operated, the right movable portion 56 and the left movable portion 57 are operated relatively largely in an operation mode different from that in the standby state. Further, the right indicator lamp 66 and the left indicator lamp 67 of the meter device 61 blink faster than in the standby state.

Accordingly, the driver can recognize that the automatic braking intervention function is operated through the visual sense and the tactile sense of the left and right legs that perform a knee gripping operation on the vehicle body.

In the operation state of the automatic braking intervention function, the right movable portion 56 and the left movable portion 57 move to the HIGH position protruding from the surrounding leg grip portion 120. Accordingly, the right movable portion 56 and the left movable portion 57, which protrude more than the LOW position, open the left and right legs wider outward in the vehicle width direction than at the LOW position. Accordingly, the driver strongly recognizes that the automatic braking intervention function is operated.

At this time, since both legs are pressed by the right movable portion 56 and the left movable portion 57 from the inside, the following effects occur. That is, the holding force of holding the vehicle body by both legs is higher than that at the LOW position. Accordingly, the riding posture is suitable for coping with the deceleration of the motorcycle 1 when the automatic braking intervention function is operated.

Figure 11:
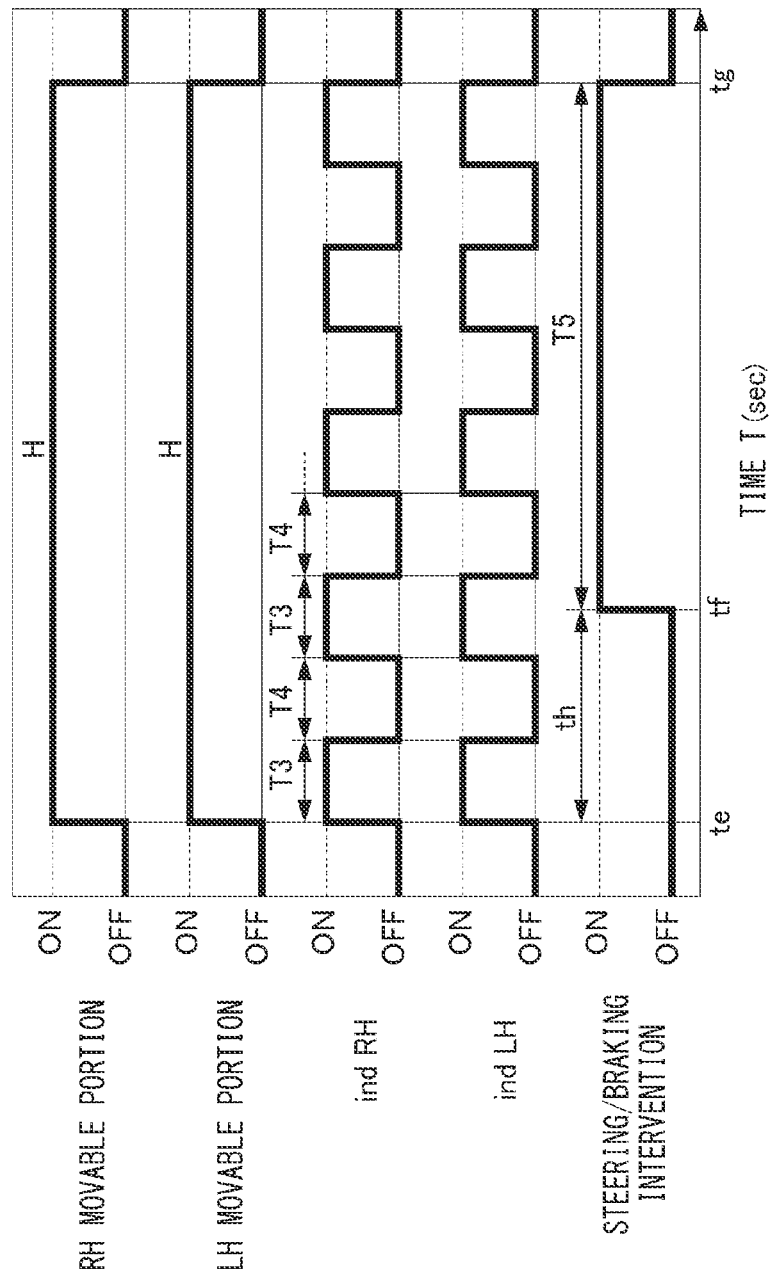
FIG. 11 is a graph showing temporal changes in the operation of various devices when the braking intervention operation of the driving assistance device is operated.

FIG. 11 shows the operation mode of the right movable portion actuator 105R and the left movable portion actuator 105L when the automatic braking intervention function is operated.

When the automatic braking intervention function is operated by an obstacle or the like in front of the motorcycle 1, both the right movable portion actuator 105R and the left movable portion actuator 105L start to be operated. At this time, the right movable portion 56 and the left movable portion 57 move from the closed position to the HIGH position. This operation is maintained continuously without a time interval during the time T5 during which the automatic braking intervention function is operated.

Further, both the right indicator lamp 66 and the left indicator lamp 67 start blinking during the operation of the right movable portion 56 and the left movable portion 57. Specifically, the right indicator lamp 66 and the left indicator lamp 67 repeat light emission for a predetermined time T3 (for example, 0.5 to 1 second). The light emission at the time T3 is repeated at intervals of a predetermined time T4 (for example, 0.5 to 1 second). The time T4 is shorter than the time T2 in the standby state. The time T3 may be equal to or shorter than the time T1 in the standby state.

Here, a timing te in which the right movable portion 56 and the left movable portion 57 start to be operated and the right indicator lamp 66 and the left indicator lamp 67 start to blink is set as below. That is, the timing te is earlier than a timing tf when the automatic braking intervention function starts to be operated by a time th (for example, about 1 second). That is, the operating of the right movable portion 56 and the left movable portion 57 and the blinking of the right indicator lamp 66 and the left indicator lamp 67 start before the operation of the automatic braking intervention function. Accordingly, it is possible to notify the driver of the start of the operation of the automatic braking intervention function.

Additionally, the operating of the right movable portion 56 and the left movable portion 57 and the blinking of the right indicator lamp 66 and the left indicator lamp 67 are simultaneously stopped at a timing tg when the operation of the automatic steering intervention function is stopped.

Figure 12:
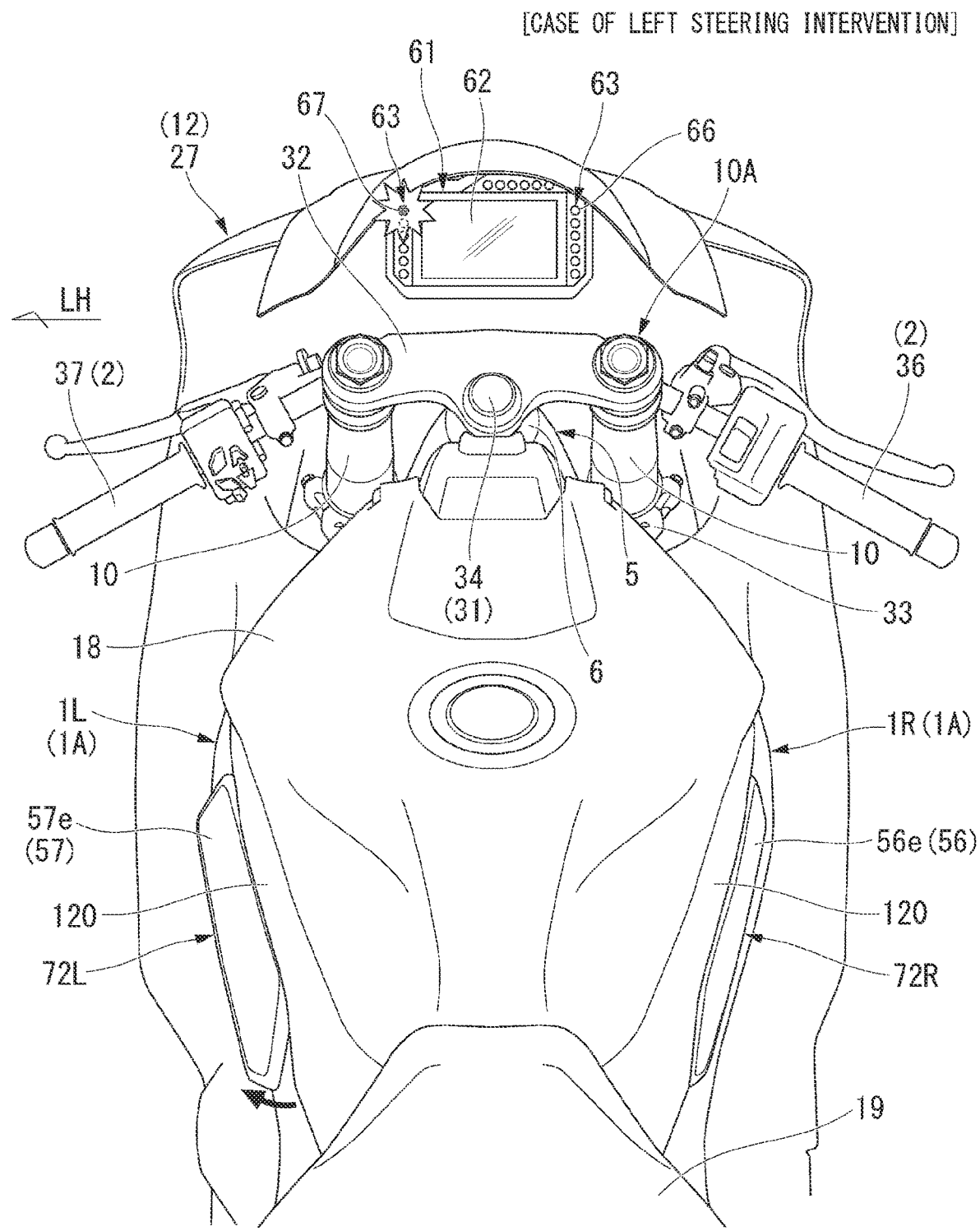
FIG. 12 is an explanatory diagram of an operation when a left steering intervention operation of the driving assistance device is operated.

FIG. 12 shows a state in which the driving assistance device 70 operates the automatic steering intervention function from the standby state and the course of the motorcycle 1 is about to turn to the left side.

For example, when the steering control unit 77 of the driving assistance device 70 determines that the motorcycle 1 has moved too far to the right side of the lane, the steering control unit 77 tries to return the course of the motorcycle 1 to the left side.

At this time, the steering control unit 77 steers the front wheel 3 to the right side by the steering actuator 74. That is, the front wheel 3 is steered in the opposite direction to the side on which the course of the motorcycle 1 is to be changed (reverse steering). Accordingly, the motorcycle 1 can be naturally steered in the course change direction.

When the above-described automatic steering intervention function is operated, only the left movable portion 57 in the course change direction (left side) of the motorcycle 1 moves from the LOW position to the HIGH position. Further, the left indicator lamp 67 of the meter device 61 blinks in a blinking mode different from that in the standby state.

Accordingly, the driver can recognize the following points through the visual sense and the tactile sense of the legs that perform the knee gripping operation on the vehicle body. That is, the driver can recognize the movement direction of the motorcycle 1 since the automatic steering intervention function is operated.

When the left movable portion 57 presses the occupant's left leg outward (leftward) in the vehicle width direction, the left leg is opened outward (leftward) in the vehicle width direction. Accordingly, the driver can strongly recognize that the automatic steering intervention function is operated to the left side of the vehicle. Further, when the left leg is opened to the left side, the driver's center of gravity moves to the left side with respect to the vehicle body and the driver can take a posture suitable for left turning.

Figure 13:
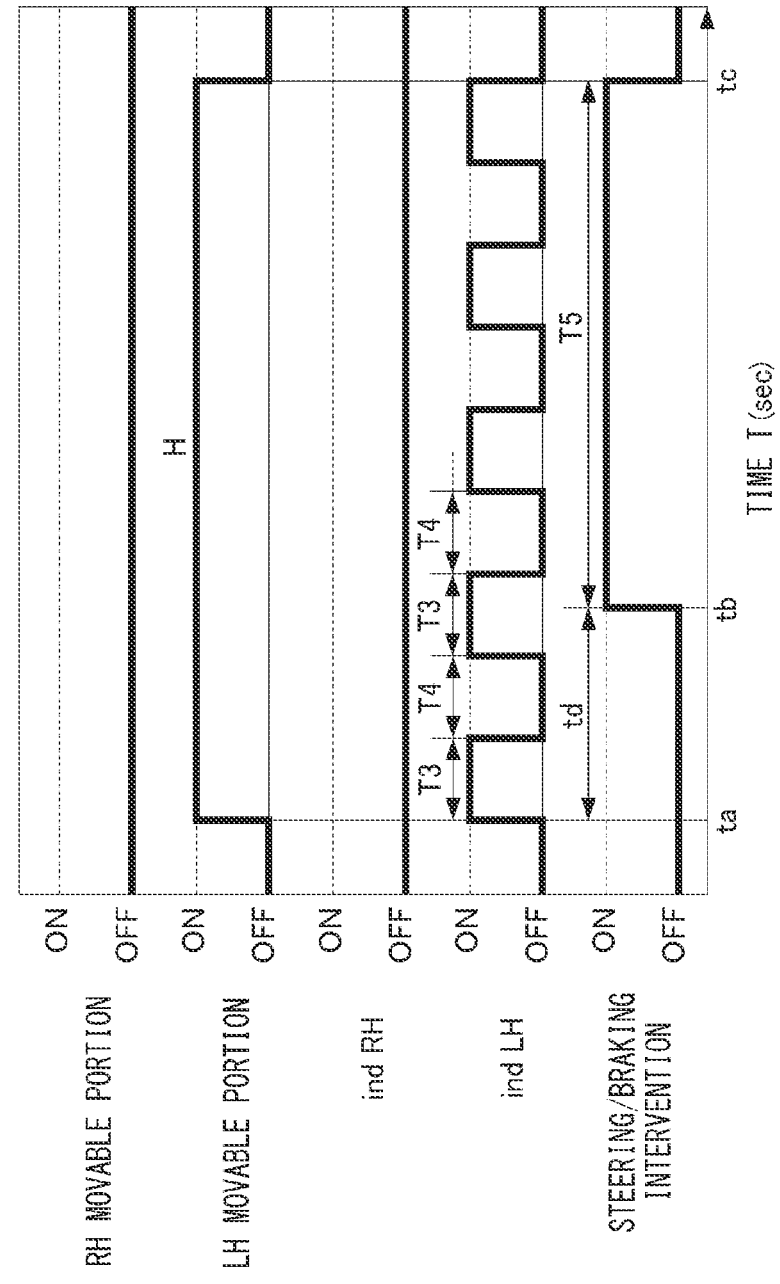
FIG. 13 is a graph showing temporal changes in the operation of various devices when the left steering intervention operation of the driving assistance device is operated.

FIG. 13 shows the operation mode of the right movable portion actuator 105R and the left movable portion actuator 105L during the operation shown in FIG. 12 of the automatic steering intervention function.

During the operation shown in FIG. 12 of the automatic steering intervention function, only the left movable portion actuator 105L is operated so that the left movable portion 57 is moved from the LOW position to the HIGH position.

During the above-described operation, the left indicator lamp 67 starts to blink differently from the standby state. This blinking may be, for example, in a mode of repeating the light emission of the time T3 (for example, 0.5 to 1 second) with a time interval of the time T4 (for example, 0.5 to 1 second) as in the case of the automatic braking intervention.

Here, a timing ta when the left movable portion 57 moves to the HIGH position and the left indicator lamp 67 starts to blink is set as below. That is, the timing ta is earlier than a timing tb when the automatic steering intervention function starts to be operated by a time td (for example, about 1 second). That is, the operating of the left movable portion actuator 105L and the blinking of the left indicator lamp 67 are started before the operation of the automatic steering intervention function. Accordingly, the driver can be notified of the start of the operation of the automatic steering intervention function.

Additionally, the operating of the left movable portion actuator 105L and the blinking of the left indicator lamp 67 are simultaneously stopped at a timing tc when the operation of the automatic steering intervention function is stopped.

Figure 14:
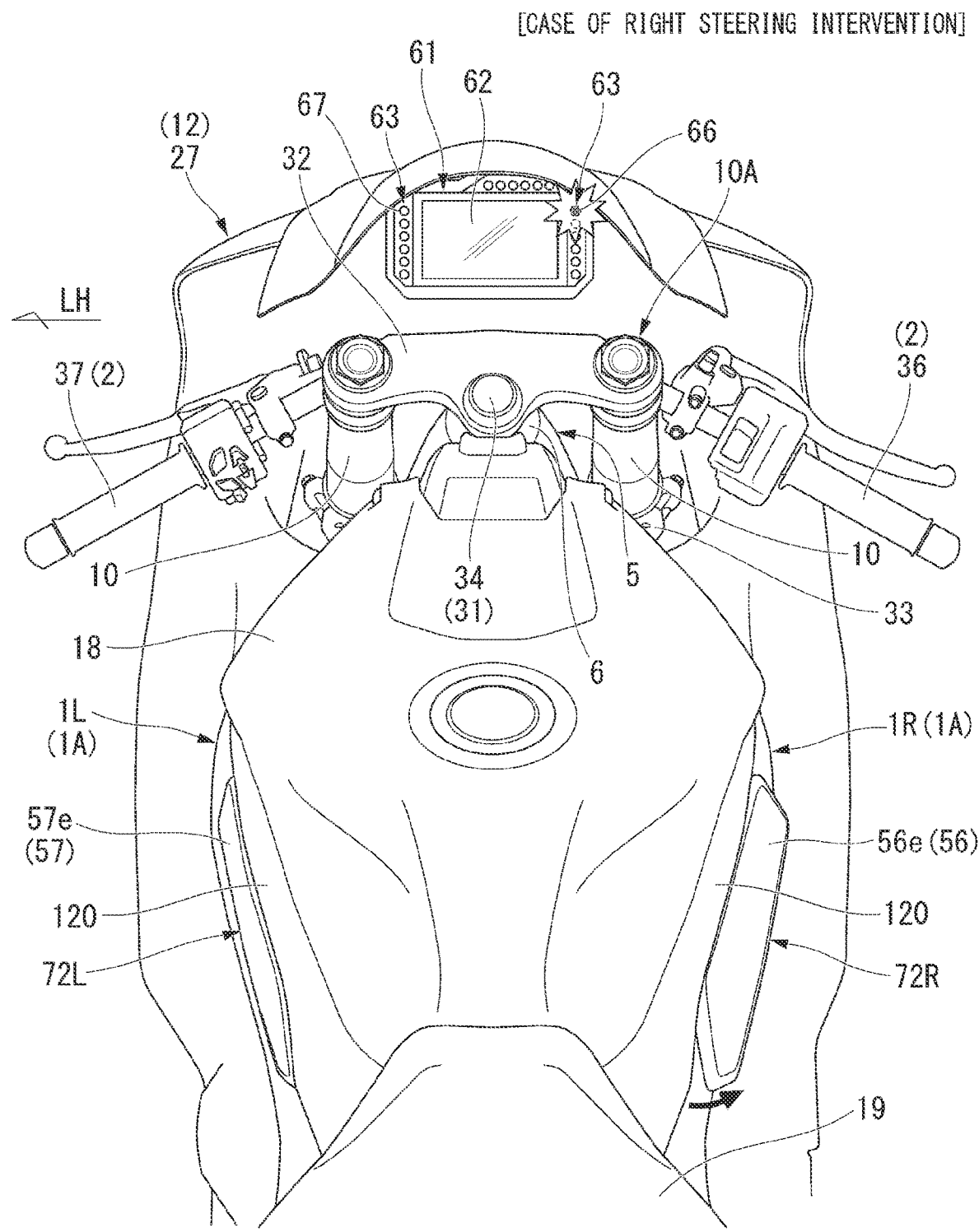
FIG. 14 is an explanatory diagram of an operation when a right steering intervention operation of the driving assistance device is operated.

FIG. 14 shows a state in which the driving assistance device 70 activates the automatic steering intervention function from the standby state and is about to turn the course of the motorcycle 1 to the right side.

For example, when the steering control unit 77 of the driving assistance device 70 determines that the motorcycle 1 has moved too far to the left side of the lane, the steering control unit 77 tries to return the course of the motorcycle 1 to the right side.

At this time, the steering control unit 77 steers the front wheel 3 to the left side by the steering actuator 74. That is, the front wheel 3 is steered in the opposite direction to the side on which the course of the motorcycle 1 is to be changed (reverse steering). Accordingly, the motorcycle 1 can be naturally steered in the course change direction.

When the automatic steering intervention function is operated, only the right movable portion 56 in the course change direction (right side) of the motorcycle 1 moves from the LOW position to the HIGH position. Further, the right indicator lamp 66 of the meter device 61 blinks in a blinking mode different from that in the standby state.

Accordingly, the driver can recognize the following points through the visual sense and the tactile sense of the legs that perform the knee gripping operation on the vehicle body. That is, it is possible to recognize the movement direction of the motorcycle 1 by the operation of the automatic steering intervention function.

When the right movable portion 56 presses the occupant's right leg outward (rightward) in the vehicle width direction, the right leg is opened outward (rightward) in the vehicle width direction. Accordingly, the driver can strongly recognize that the automatic steering intervention function is operated to the right side of the vehicle. Further, when the right leg is opened to the right side, the driver's center moves to the right side with respect to the vehicle body and the driver can take a posture suitable for right turning.

Figure 15:
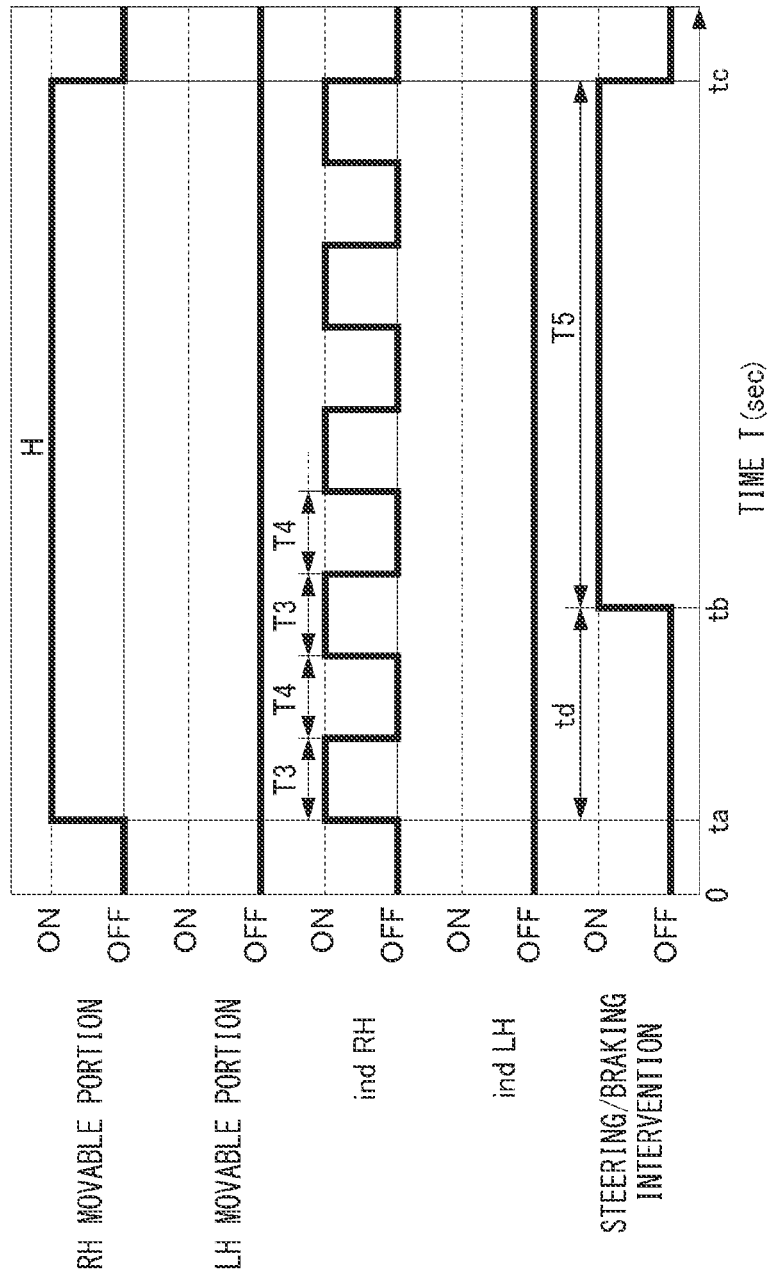
FIG. 15 is a graph showing temporal changes in the operation of various devices when the right steering intervention operation of the driving assistance device is operated.

FIG. 15 shows the operation mode of the right movable portion actuator 105R and the left movable portion actuator 105L during the operation shown in FIG. 14 of the automatic steering intervention function.

During the operation shown in FIG. 14 of the automatic steering intervention function, only the right movable portion actuator 105R is operated so that the right movable portion 56 is moved from the LOW position to the HIGH position.

During the above-described operation, the right indicator lamp 66 starts to blink differently from the standby state. This blinking may be, for example, in a mode of repeating the light emission of the time T3 (for example, 0.5 to 1 second) with a time interval of the time T4 (for example, 0.5 to 1 second) as in the case of the automatic braking intervention.

Here, a timing ta when the right movable portion 56 moves to the HIGH position and the right indicator lamp 66 starts to blink is set as below. That is, the timing ta is earlier than a timing tb when the automatic steering intervention function starts to be operated by a time td (for example, about 1 second). That is, the operating of the right movable portion actuator 105R and the blinking of the right indicator lamp 66 are started before the operation of the automatic steering intervention function. Accordingly, the driver can be notified of the start of the operation of the automatic steering intervention function.

Additionally, the operating of the right movable portion actuator 105R and the blinking of the right indicator lamp 66 are simultaneously stopped at a timing tc when the operation of the automatic steering intervention function is stopped.

As described above, in the vehicle information notification device of the above-described embodiment, at least one of the pair of left and right vehicle body outer portions 1L and 1R in the vehicle body 1A steerably supporting the steering system component 10A is provided with the left and right movable portions 56 and 57 which are operated by the left and right movable portion actuators 105L and 105R. The left and right movable portions 56 and 57 include the left and right outer side surfaces 56e and 57e which are provided in front of the seat 19 on which the driver sits and above the step 25 on which the driver's feet are placed so that the driver's legs are able to contact the left and right outer side surfaces. The left and right movable portions 56 and 57 notify the driver of predetermined information by operating the left and right outer side surfaces 56e and 57e in a predetermined motion.

According to this configuration, at least one of the pair of left and right vehicle body outer portions 1L and 1R of the vehicle body 1A is provided with the left and right movable portions 56 and 57. By the operation of the left and right movable portions 56 and 57, predetermined information can be notified to the driver's legs. The left and right movable portions 56 and 57 are separated from the steering system component 10A (especially, the handle 2). Accordingly, the notification of information by the left and right movable portions 56 and 57 and the steering operation are separated from each other and the driver can easily receive notified information.

Further, in the vehicle information notification device, the left and right movable portions 56 and 57 are operated so that the left and right outer side surfaces 56e and 57e are moved outward in the vehicle width direction. Accordingly, it is possible to increase the certainty of contact with the driver's legs and to easily receive notified information by the driver.

Further, in the vehicle information notification device, the left and right movable portions 56 and 57 are respectively provided in the pair of left and right vehicle body outer portions 1L and 1R and are operable independently of each other. Accordingly, it is possible to combine the difference in which of the left and right movable portions 56 and 57 is operated. Accordingly, it is possible to notify the driver of a lot of information and to increase the type of information to be notified.

Further, the vehicle information notification device includes the operation intervention function capable of intervening in operations performed by the driver and the left and right movable portions 56 and 57 are operated while being interlocked with the operation intervention function. Accordingly, it is possible to notify the driver that the operation intervention function is operated by the operation of the left and right movable portions 56 and 57.

Further, in the vehicle information notification device, when the operation intervention function is operated, the left and right movable portions 56 and 57 start to be operated at the timings ta and te earlier than the timings tb and tf of starting the operation of the operation intervention function. Accordingly, it is possible to notify the driver of the start of the operation of the operation intervention function in advance.

Further, in the vehicle information notification device, at least one of the steering intervention function and the braking intervention function is provided as the operation intervention function. Accordingly, it is possible to notify the driver that at least one of the steering intervention function and the braking intervention function is operated by the operation of the left and right movable portions 56 and 57.

Further, in the vehicle information notification device, both left and right movable portions 56 and 57 are operated when the braking intervention function is operated. Accordingly, it is possible to notify the driver that the braking intervention function is operated by the operation of both left and right movable portions. Accordingly, it is possible to increase the certainty of the notification of the operation of the braking intervention function that tends to cause behavior.

Further, in the vehicle information notification device, one of the left and right movable portions 56 and 57 is operated when the steering intervention function is operated. Accordingly, it is possible to notify the driver that the steering intervention function is operated by the operation of one of the left and right movable portions 56 and 57. That is, it is possible to notify the driver of information including the steering direction by the steering intervention function depending on which of the left and right movable portions 56 and 57 is operated.

Further, in the vehicle information notification device, the steering intervention function includes a course change function for changing the course of the motorcycle 1 to any one of left and right. When the steering intervention function is operated, one that changes the course of the motorcycle 1 in the left and right movable portions 56 and 57 is operated so that the outer side surfaces 56e and 57e are moved outward in the vehicle width direction. Accordingly, the leg of the driver on the side of the course change is opened outward in the vehicle width direction, and the posture suitable for steering can be urged.

Further, in the vehicle information notification device, the left and right movable portions 56 and 57 are operated as below in the standby state in which the system of the operation intervention function is activated and the operation intervention function is not operated yet. That is, the left and right movable portions 56 and 57 are operated in an operation mode different from that when the operation intervention function is operated. Accordingly, it is possible to notify the driver that the operation intervention function is in the standby state.

Further, the vehicle information notification device further includes the left and right display devices 66 and 67 which display predetermined information for the driver while being interlocked with the operation of the left and right movable portions 56 and 57. Accordingly, it is possible to further reliably notify the driver of information by the operation of the left and right movable portions 56 and 57 and the display of the left and right display devices 66 and 67.

Additionally, the present invention is not limited to the above-described embodiment. For example, the driving assistance device 70 includes the steering intervention function and the braking intervention function as the operation intervention function, but the present invention is not limited thereto. That is, the driving assistance device 70 may include only one of the steering intervention function and the braking intervention function as the operation intervention function.

In the embodiment, an example of notifying the operation information of the device related to driving assistance was shown, but the present invention is not limited thereto. That is, the notification may be, for example, the notification of information from a navigation system or ITS (Intelligent Transport Systems).

The present invention is not limited to a configuration in which the movable portion is provided in both left and right vehicle body outer portions. That is, the present invention may have a configuration in which the movable portion is provided in only one of the left and right vehicle body outer portions.

The movable portion may be provided in a part (including the step) of the vehicle body outer portion where the driver's lower legs and feet (for example, calves, ankles, soles, and the like) can come into contact. The step is not limited to a bar type, but include a floor type and a board type. The movable portion may be provided in the seat that contacts the driver's buttocks or around the base of the leg or in the lumbar that contacts the waist. That is, the movable portion may form an outer surface that naturally comes into contact with the body (especially, the lower half of the body) of the driver in the normal riding posture.

The saddle type vehicle includes all vehicles in which the driver straddles the vehicle body. That is, the saddle type vehicle includes not only motorcycles (including motorized bicycles and scooter-type vehicles), but also vehicles with three wheels (including vehicles with one front wheel and two rear wheels as well as vehicles with two front wheels and one rear wheel) or four wheels. Further, the saddle type vehicle also includes vehicles whose prime mover includes an electric motor.

Then, the configuration of the above-described embodiment is an example of the present invention. That is, various modifications can be made without departing from the gist of the present invention, such as replacing the constituent elements of the embodiments with well-known constituent elements.

BRIEF DESCRIPTION OF THE REFERENCE SYMBOLS

1: Motorcycle (saddle type vehicle)
1A: Vehicle body
1L: Left vehicle body outer portion (vehicle body outer portion)

1R: Right vehicle body outer portion (vehicle body outer portion)
10A: Steering system component
19: Seat
25: Step
56: Right movable portion (movable portion)
56e: Outer side surface
57: Left movable portion (movable portion)
57e: Outer side surface
66: Right indicator lamp (display device)
67: Left indicator lamp (display device)
105R: Right movable portion actuator (actuator)
105L: Left movable portion actuator (actuator)
tb, tf: Timing (timing of starting operation of operation intervention function)
ta, te: Timing (timing earlier than start of operation of operation intervention function)

What is claim is:

1. A motorcycle information notification device comprising:
   movable portions which are provided in at least one of a pair of left and right vehicle body outer portions in a vehicle body and are operated by movable portion actuators, steerably supporting a steering system component; and
   an operation intervention function capable of intervening in operations performed by a driver,
   wherein the movable portion actuators are connected to the movable portions through a link member,
   wherein the movable portions include outer surfaces which are able to contact driver's legs,
   wherein the movable portions notify the driver of predetermined information by operating the outer surfaces in a predetermined motion,
   wherein the movable portions are operated while being interlocked with the operation intervention function, and
   wherein, when the operation intervention function is operated, the outer surfaces protrude outward in a vehicle width direction from remaining general surfaces of the vehicle body outer portions at a timing earlier than a timing of starting the operation of the operation intervention function.

2. The motorcycle information notification device according to claim 1,
   wherein the movable portions include the outer surfaces provided in front of a seat and above a step to be able to contact the driver's legs.

3. The motorcycle information notification device according to claim 1,
   wherein the movable portions are respectively provided in the pair of left and right vehicle body outer portions and are operable independently of each other.

4. The motorcycle information notification device according to claim 1,
   wherein at least one of a steering intervention function and a braking intervention function is provided as the operation intervention function.

5. The motorcycle information notification device according to claim 4,
   wherein both the left and right movable portions are operated when the braking intervention function is operated.

6. The motorcycle information notification device according to claim 4,
   wherein one of the left and right movable portions is operated when the steering intervention function is operated.

7. The motorcycle information notification device according to claim 4,
   wherein the steering intervention function includes a course change function for changing a course of a vehicle to any one of left and right,
   wherein the movable portions are operated so that the outer surfaces are moved outward in the vehicle width direction, and
   wherein when the steering intervention function is operated, the movable portions that change the course of the vehicle are operated so that the outer surfaces are moved outward in the vehicle width direction.

8. The motorcycle information notification device according to claim 1,
   wherein in a standby state in which a system of the operation intervention function is activated and the operation intervention function is not operated yet, the movable portions are operated in an operation mode different from that when the operation intervention function is operated.

9. The motorcycle information notification device according to claim 1, further comprising:
   display devices which display predetermined information for the driver while being interlocked with the operation of the movable portions.

10. The motorcycle information notification device according to claim 1,
    wherein operation positions of the movable portions include at least a first operation position in which the outer surfaces are moved outward in the vehicle width direction by a first prescribed amount from an initial position, and a second operation position in which the outer surfaces are further moved outward in the vehicle width direction by a second prescribed amount from the first operation position.

* * * * *